(12) United States Patent
Chen

(10) Patent No.: US 11,902,563 B2
(45) Date of Patent: Feb. 13, 2024

(54) ENCODING AND DECODING METHOD AND DEVICE, ENCODER SIDE APPARATUS AND DECODER SIDE APPARATUS

(71) Applicant: Hangzhou Hikvision Digital Technology Co., Ltd., Hangzhou (CN)

(72) Inventor: Fangdong Chen, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 372 days.

(21) Appl. No.: 17/433,953

(22) PCT Filed: Mar. 11, 2020

(86) PCT No.: PCT/CN2020/078849
§ 371 (c)(1),
(2) Date: Aug. 25, 2021

(87) PCT Pub. No.: WO2020/182161
PCT Pub. Date: Sep. 17, 2020

(65) Prior Publication Data
US 2022/0167004 A1    May 26, 2022

(30) Foreign Application Priority Data

Mar. 11, 2019  (CN) .......................... 201910182197.8

(51) Int. Cl.
*H04N 19/52*        (2014.01)
*H04N 19/105*       (2014.01)
(Continued)

(52) U.S. Cl.
CPC ........... *H04N 19/52* (2014.11); *H04N 19/105* (2014.11); *H04N 19/132* (2014.11);
(Continued)

(58) Field of Classification Search
CPC .. H04N 19/105; H04N 19/132; H04N 19/139; H04N 19/14; H04N 19/159;
(Continued)

(56) References Cited

U.S. PATENT DOCUMENTS 5,778,190 A      7/1998  Agarwal
11,563,949 B2 *  1/2023  Chen ...................... H04N 19/52
(Continued)

FOREIGN PATENT DOCUMENTS

CN        1444406       9/2003
CN        1497981       5/2004
(Continued)

OTHER PUBLICATIONS

International Search Report and Written Opinion issued in Corresponding PCT Application No. PCT/CN2020/078849, dated Jun. 10, 2020 (English Translation provided).
(Continued)

*Primary Examiner* — Kathleen M Walsh
(74) *Attorney, Agent, or Firm* — NORTON ROSE FULBRIGHT US LLP

(57) ABSTRACT

The application relates to an encoding and decoding method and apparatus, an encoding-side device, and a decoding-side device. The method includes: if characteristic information of a current block meets a specific condition, determining a first reference block corresponding to the current block according to a first original motion vector of the current block, and determining a second reference block corresponding to the current block according to a second original motion vector of the current block; adjusting the first and second original motion vectors according to a first pixel value of the first reference block and a second pixel value of the second reference block to obtain a first target motion vector corresponding to the first original motion vector and a second
(Continued)

target motion vector corresponding to the second original motion vector; encoding or decoding the current block according to the first and second target motion vectors.

20 Claims, 8 Drawing Sheets

(51) Int. Cl.
*H04N 19/139* (2014.01)
*H04N 19/14* (2014.01)
*H04N 19/159* (2014.01)
*H04N 19/176* (2014.01)
*H04N 19/182* (2014.01)
*H04N 19/56* (2014.01)
*H04N 19/132* (2014.01)
*H04N 19/30* (2014.01)

(52) U.S. Cl.
CPC .......... *H04N 19/139* (2014.11); *H04N 19/14* (2014.11); *H04N 19/159* (2014.11); *H04N 19/176* (2014.11); *H04N 19/182* (2014.11); *H04N 19/30* (2014.11); *H04N 19/56* (2014.11)

(58) Field of Classification Search
CPC .... H04N 19/176; H04N 19/182; H04N 19/30; H04N 19/513; H04N 19/52; H04N 19/533; H04N 19/557; H04N 19/56; H04N 19/103; H04N 19/137; H04N 19/577
USPC .................................................... 375/240.16
See application file for complete search history.

(56) References Cited

U.S. PATENT DOCUMENTS

| | | | |
|---|---|---|---|
| 2005/0114093 | A1 | 5/2005 | Cha et al. |
| 2005/0259878 | A1 | 11/2005 | Drezner et al. |
| 2006/0133500 | A1 | 6/2006 | Lee et al. |
| 2007/0081588 | A1 | 4/2007 | Raveendran et al. |
| 2007/0230563 | A1 | 10/2007 | Tian et al. |
| 2007/0286506 | A1 | 12/2007 | Choi et al. |
| 2008/0002774 | A1 | 1/2008 | Hoshino et al. |
| 2011/0002390 | A1 | 1/2011 | Chiu et al. |
| 2011/0170595 | A1 | 7/2011 | Shi et al. |
| 2012/0008690 | A1 | 1/2012 | Lee et al. |
| 2012/0320981 | A1 | 12/2012 | Shimada et al. |
| 2014/0049605 | A1 | 2/2014 | Chen et al. |
| 2014/0147012 | A1 | 5/2014 | Park et al. |
| 2014/0270555 | A1 | 9/2014 | Chun et al. |
| 2015/0036747 | A1 | 2/2015 | Oh et al. |
| 2015/0103915 | A1 | 4/2015 | Xu et al. |
| 2015/0156495 | A1 | 6/2015 | Lee et al. |
| 2016/0057420 | A1 | 2/2016 | Pang et al. |
| 2016/0134886 | A1 | 5/2016 | Chen et al. |
| 2016/0219278 | A1 | 7/2016 | Chen et al. |
| 2016/0286230 | A1 | 9/2016 | Li et al. |
| 2017/0142418 | A1 | 5/2017 | Li et al. |
| 2018/0098070 | A1 | 4/2018 | Chuang et al. |
| 2018/0184117 | A1 | 6/2018 | Chen et al. |
| 2018/0199057 | A1 | 7/2018 | Chuang et al. |
| 2018/0249172 | A1 | 8/2018 | Chen et al. |
| 2019/0297325 | A1 | 9/2019 | Lim et al. |
| 2021/0092439 | A1 | 3/2021 | Ikai et al. |
| 2021/0203981 | A1* | 7/2021 | Unno ............... H04N 19/57 |

FOREIGN PATENT DOCUMENTS

| | | |
|---|---|---|
| CN | 1525762 | 9/2004 |
| CN | 1671209 | 9/2005 |
| CN | 101188772 | 5/2008 |
| CN | 101477690 | 7/2009 |
| CN | 101563925 | 10/2009 |
| CN | 101699865 | 4/2010 |
| CN | 101815218 | 8/2010 |
| CN | 101895762 | 11/2010 |
| CN | 102316317 | 1/2012 |
| CN | 102387360 | 3/2012 |
| CN | 102395030 | 3/2012 |
| CN | 102447904 | 5/2012 |
| CN | 102611886 | 7/2012 |
| CN | 102611890 | 7/2012 |
| CN | 102685504 | 9/2012 |
| CN | 102769748 | 11/2012 |
| CN | 102833583 | 12/2012 |
| CN | 103260020 | 8/2013 |
| CN | 103297778 | 9/2013 |
| CN | 103338377 | 10/2013 |
| CN | 103503458 | 1/2014 |
| CN | 103974077 | 8/2014 |
| CN | 104427345 | 3/2015 |
| CN | 105493505 | 4/2016 |
| CN | 105681807 | 6/2016 |
| CN | 105939475 | 9/2016 |
| CN | 106331703 | 1/2017 |
| CN | 106576171 | 4/2017 |
| CN | 106878737 | 6/2017 |
| CN | 107027029 | 8/2017 |
| CN | 107409211 | 11/2017 |
| CN | 107925760 | 4/2018 |
| CN | 108134939 | 6/2018 |
| CN | 108259912 | 7/2018 |
| CN | 108419082 | 8/2018 |
| CN | 108496367 | 9/2018 |
| CN | 108605136 | 9/2018 |
| CN | 108702512 | 10/2018 |
| CN | 108833923 | 11/2018 |
| CN | 108848380 | 11/2018 |
| CN | 109005412 | 12/2018 |
| CN | 109218733 | 1/2019 |
| CN | 109417629 | 3/2019 |
| CN | 110312132 | 10/2019 |
| CN | 2020053723 | 4/2020 |
| JP | 2006279573 | 10/2006 |
| JP | 2018093346 | 6/2018 |
| KR | 20110017302 | 2/2011 |
| KR | 20120110795 | 10/2012 |
| KR | 20180038371 | 4/2018 |
| RU | 2518718 | 6/2014 |
| RU | 2679195 | 2/2019 |
| WO | WO 2009/045021 | 4/2009 |
| WO | WO 2012/042719 | 4/2012 |
| WO | WO 2017/138417 | 8/2017 |
| WO | WO 2018/022309 | 2/2018 |
| WO | WO 2018/113658 | 6/2018 |
| WO | WO 2018/121506 | 7/2018 |
| WO | WO 2018/128417 | 7/2018 |
| WO | WO-2018121506 A1 * | 7/2018 ........... H04N 19/105 |
| WO | WO 2018/200960 | 11/2018 |
| WO | WO 2019/001024 | 1/2019 |
| WO | WO 2019/001259 | 1/2019 |
| WO | WO 2019/001785 | 1/2019 |
| WO | WO 2019/001786 | 1/2019 |
| WO | WO-2019001259 A1 * | 1/2019 ........... H04N 19/139 |
| WO | WO 2019/045392 | 3/2019 |

OTHER PUBLICATIONS

Li, Jun. "Realization of High Efficiency Transcoder for MPEG-2 to H.264" Computer Knowledge and Technology 2017, 13(6), 219-222.

Patil et al., "An Effective Motion Re-estimation in Frame-skipping Video Transcoding" IEEE Computer Society, Proceedings of the International Conference on Computing: Theory and Applications (ICCTA'07), 2007, Indian Institute of Technology Kharagpur, WB 721 302, India, 5 pages.

Purnachand et al., "Fast Motion Estimation Algorithm for HEVC" *IEEE Second International Conference on Consumer Electronics Berlin (ICCE*-Berlin) 2012, 4 pages.

(56) References Cited

OTHER PUBLICATIONS

Seregin, Vadim. "SCE5: Cross-verification of test 5.1 .6 on inter-layer motion vector prediction"Joint Video Exploration Team (JVET), 13$^{th}$ Meeting: Incheon, KR, Apr. 18-26, 2013, 2 pages.

Sethuraman, Sriram. "Non-CE9: Simplifications to DMVR search pattern and interpolation for refinement"Joint Video Exploration Team (JVET), 13th Meeting: Marrakesh, MA, Jan. 9-18, 2019, 7 pages.

Tu, Yutong. *Hardware Design of Inter-frame Predicting Module in SVAC Encoder*. 2016. Shandong University, Thesis for Master Degree (English Abstract).

Zhou et al., "JVET AHG report: Implementation studies (AHG16)" Joint Video Exploration Team (JVET), 13$^{th}$ Meeting: Marrakesh, MA Jan. 9-18, 2019, 5 pages.

Park et al., "CE4-related: Candidates optimization on MMVD", *Joint Video Experts Team* (JVET) of ITU-T SG16 WP3 and ISO/IEC JTC 1/SC 29/WG 11, JVET-M0307-v2, 13$^{th}$ meeting: Marrakech, Jan. 2019, 5 pages.

Office Action issued in corresponding Russian Application No. 2022118855, dated Mar. 1, 2023 (English translation provided).

Bross et al., "Chapter 5 Inter-Picture Prediction in HEVC." *High Efficiency Video Coding (HEVC): Algorithms and Architectures*, edited by Vivienne Sze et al., Springer, 2014, pp. 113-140.

Chen, Fangdong. "CE9: Unidirectional Template based DMVR and its Combination with Simplified Bidirectional DMVR (Test 9.2.10 and Test 9.2.11)" Joint Video Experts Team (JVET), 12th Meeting: Macao, CN, Oct. 3-12, 2018, JVET-L0188_v3, 5 pages.

Esenlik et al., "CE9: DMVR with Motion Vector Difference Mirroring (Test 1.6)" Joint Video Experts Team (JVET), 11th Meeting: Ljubljana, SI, Jul. 10-18, 2018, JVET-K0216-v2, 5 pages.

Bross et al., "Versatile Video Coding (Draft 4)" *Joint Video Experts Team (JVET) of ITU-TSG 16 WP 3 and ISO/IEC JTC 1/SC 29/WG 11*, 13th Meeting: Marrakech, MA, Jan. 9-18, 2019, Document: JVET-M1001, 299 pages.

Chen et al., "Algorithm description for Versatile Video Coding and Test Model 4 (VTM 4)" *Joint Video Experts Team (JVET) of ITU-TSG 16 WP 3 and ISO/IEC JTC 1/SC 29/WG 11*, 13th Meeting: Marrakech, MA, Jan. 9-18, 2019, Document: JVET-M1002, 65 pages.

Chen et al., "Decoder-Side Motion Vector Refinement Based on Bilateral Template Matching" *Joint Video Exp/oration Team (JVET) of lTU-TSG 16 WP 3 and ISO/IEC JTC 1/SC 29/WG 11*, 4th Meeting: Chengdu, CN, Oct. 15-21, 2016, HiSilicon Technologies, Document: JVET-D0029, 4 pages.

Chen et al., "EE3: Decoder-Side Motion Vector Refinement Based on Bilateral Template Matching" *Joint Video Exploration Team (JVET) of ITU-TSG 16 WP 3 and ISO/IEC JTC 1/SC 29/WG 11*, 4th Meeting: Chengdu, CN, Oct. 15-21, 2016, HiSilicon Technologies, 4 pages.

Huang et al., "New Multi-hypothesis Motion-compensated Prediction Algorithm" Journal of Image and Graphics 2008, 13(3), 428-434 (English Abstract).

Rao et al., *Temporal Motion Prediction for Fast Motion Estimation in Multiple Reference Frames*, 2006 IEEE International Symposium on Signal Processing and Information Technology, 817-820.

Ye et al., "AHG13: on bi-prediction with weighted averaging and weighted prediction" *Joint Video Experts Team (JVET) of ITU-T SG 16 WP 3 and ISO/IEC JTC 1/SC 29/WG 11*, 13th Meeting: Marrakech, MA, Jan. 9-18, 2019, Alibaba Group U.S., Technicolor, Document: JVET-M0111,7 pages.

Office Action issued in corresponding Singapore Application No. 11202109366V, dated May 12, 2023.

\* cited by examiner

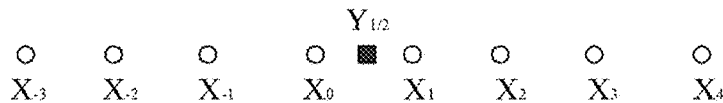

Fig. 1A

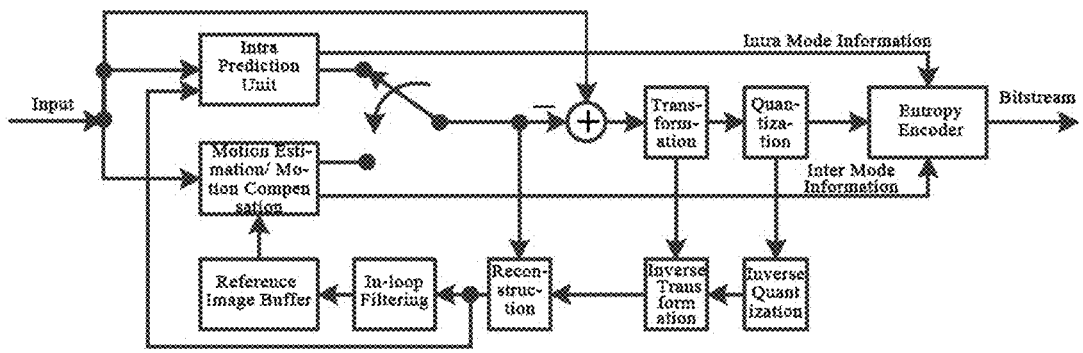

Fig. 1B

```
┌─────────────────────────────────────────────────────────────────────────────┐ 201
│ If characteristic information of the current block meets a specific condition, determining a first reference block │
│ corresponding to a first original motion vector of the current block, and determining a second reference block │
│ corresponding to the current block according to a second original motion vector of the current block │
└─────────────────────────────────────────────────────────────────────────────┘
                                        │
                                        ▼
┌─────────────────────────────────────────────────────────────────────────────┐ 202
│ Adjusting the first and second original motion vectors according to a first pixel value of the first reference │
│ block and a second pixel value of the second reference block to obtain a first target motion vector corresponding │
│ to the first original motion vector and a second target motion vector corresponding to the second original │
│                                    motion vector │
└─────────────────────────────────────────────────────────────────────────────┘
                                        │
                                        ▼
┌─────────────────────────────────────────────────────────────────────────────┐ 203
│       Encoding or decoding the current block according to the first and second target motion vectors             │
└─────────────────────────────────────────────────────────────────────────────┘
```

Fig. 2

ENCODING AND DECODING METHOD AND DEVICE, ENCODER SIDE APPARATUS AND DECODER SIDE APPARATUS

CROSS-REFERENCE TO RELATED APPLICATIONS

The present application is a national phase under 35 U.S.C. § 371 of International Application No. PCT/CN2020/078849, filed Mar. 11, 2020, which claims the benefit of priority to Chinese Patent Application No. 201910182197.8, filed Mar. 11, 2019, the entire contents of each of which are hereby incorporated by reference in their entirety.

TECHNICAL FIELD

The present application relates to encoding and decoding technologies, in particular to an encoding and decoding method and apparatus, an encoding-side device, and a decoding-side device.

BACKGROUND

In order to save space, video images are transmitted after being encoded, and the complete video encoding method may include the processes of prediction, transformation, quantization, entropy encoding, filtering and the like. The prediction encoding includes inter coding and intra coding, wherein the inter coding uses the pixels of the adjacent encoded image to predict the pixels of the current image according to the time domain correlation of a video, so as to effectively remove the video time domain redundancy.

In the process of inter coding, a Motion Vector (MV) can be used to represent a relative displacement between a current image block of a video image of a current frame and a reference image block of a video image of a reference frame. For example, if there is a strong time domain correlation between a video image A of the current frame and a video image B of the reference frame, when an image block A1 (a current image block) of the video image A needs to be transmitted, a motion search can be performed in the video image B to find an image block B1 (i.e., a reference image block) that best matches the image block A1, and to determine a relative displacement between the image block A1 and the image block B1, the relative displacement is also the motion vector of the image block A1.

The encoding side can send the motion vector to the decoding side, rather than send the image block A1 to the decoding side. The decoding side can obtain the image block A1 based on the motion vector and the image block B1. Obviously, the above approach can save a large number of bits because the number of bits occupied by the motion vector is smaller than the number of bits occupied by the image block A1.

In the conventional method, when a current block is a unidirectional block, after a motion vector of the current block (hereinafter referred to as an original motion vector) is obtained, the original motion vector can be adjusted, and encoding/decoding can be implemented based on the adjusted motion vector, thereby improving encoding performance. However, when the current block is a bi-directional block, there is no reasonable solution at present that how to adjust the first original motion vector and the second original motion vector after obtaining the first and second original motion vectors of the current block. That is, in the case of a bi-directional block, there may be problems of low prediction quality, prediction error, and the like, resulting in poor encoding performance.

SUMMARY

The present application provides a method, an apparatus and a device for encoding and decoding, which can improve encoding performance.

The present application provides an encoding and decoding method, which includes the following steps: if characteristic information of a current block meets a specific condition, determining a first reference block corresponding to the current block according to a first original motion vector of the current block, and determining a second reference block corresponding to the current block according to a second original motion vector of the current block; adjusting the first and second original motion vectors according to a first pixel value of the first reference block and a second pixel value of the second reference block to obtain a first target motion vector corresponding to the first original motion vector and a second target motion vector corresponding to the second original motion vector; encoding or decoding the current block according to the first and second target motion vectors.

The present application provides an encoding and decoding apparatus, which includes: a determining module configured for, if characteristic information of a current block meets a specific condition, determining a first reference block corresponding to the current block according to a first original motion vector of the current block, and determining a second reference block corresponding to the current block according to a second original motion vector of the current block; a processing module configured for adjusting the first and second original motion vectors according to a first pixel value of the first reference block and a second pixel value of the second reference block to obtain a first target motion vector corresponding to the first original motion vector and a second target motion vector corresponding to the second original motion vector; and an encoding and decoding module configured for encoding or decoding the current block according to the first and second target motion vectors.

The present application provides an encoding-side device, which includes a processor and a machine-readable storage medium, wherein the machine-readable storage medium has stored thereon machine-executable instructions that, upon execution by the processor, cause performance of a set of operations: if characteristic information of a current block meets a specific condition, determining a first reference block corresponding to the current block according to a first original motion vector of the current block, and determining a second reference block corresponding to the current block according to a second original motion vector of the current block; adjusting the first and second original motion vectors according to a first pixel value of the first reference block and a second pixel value of the second reference block to obtain a first target motion vector corresponding to the first original motion vector and a second target motion vector corresponding to the second original motion vector; and encoding the current block according to the first and second target motion vectors.

The present application provides a decoding-side device, which includes a processor and a machine-readable storage medium, wherein the machine-readable storage medium has stored thereon machine-executable instructions that, upon execution by the processor, cause performance of a set of operations: if characteristic information of a current block meets a specific condition, determining a first reference block corresponding to the current block according to a first original motion vector of the current block, and determining a second reference block corresponding to the current block according to a second original motion vector of the current block; adjusting the first and second original motion vectors according to a first pixel value of the first reference block and a second pixel value of the second reference block to obtain a first target motion vector corresponding to the first original motion vector and a second target motion vector corresponding to the second original motion vector; and decoding the current block according to the first and second target motion vectors.

The present application provides a decoding method, comprising: when a current block enables a motion vector refinement mode, determining prediction values of sub-blocks of the current block, and determining a prediction value of the current block according to the prediction values of sub-blocks of the current block, wherein for each sub-block of the current block, determining a prediction value of a sub-block comprises: obtaining motion information of the current block comprising a first original motion vector and a first reference frame, a second original motion vector and a second reference frame; determining a first reference block corresponding to the sub-block according to the first original motion vector of the current block, and determining a second reference block corresponding to the sub-block according to the second original motion vector of the current block; obtaining an optimal motion vector according to pixel values of the first reference block and pixel values of the second reference block, wherein obtaining an optimal motion vector comprises: taking an initial motion vector as a center, selecting motion vectors from the motion vectors containing the initial motion vector and motion vectors surrounding the initial motion vector, and determining the selected motion vectors as candidate motion vectors; wherein the initial motion vector is the first original motion vector or the second original motion vector; obtaining a cost value corresponding to the initial motion vector and cost values corresponding to the candidate motion vectors according to the pixel values of the first reference block and the pixel values of the second reference block; selecting a motion vector from the initial motion vector and the candidate motion vectors as the optimal motion vector according to the cost value corresponding to the initial motion vector and the cost values corresponding to the candidate motion vectors; adjusting the first original motion vector and the second original motion vector according to the optimal motion vector to obtain a first target motion vector corresponding to the first original motion vector and a second target motion vector corresponding to the second original motion vector; determining the prediction value of the sub-block according to the first target motion vector and the second target motion vector; wherein determining the prediction value of the sub-block according to the first target motion vector and the second target motion vector comprises: determining a third reference block corresponding to the sub-block according to the first target motion vector, and determining a fourth reference block corresponding to the sub-block according to second target motion vector; weighting pixel values of the third reference block and pixel values of the fourth reference block to obtain the prediction value of the sub-block.

As an example, taking an initial motion vector as a center, selecting motion vectors from the motion vectors containing the initial motion vector and the motion vectors surrounding the initial motion vector, and determining the selected motion vectors as candidate motion vectors, comprises: taking the initial motion vector as a center, searching 25 motion vectors containing the initial motion vector at a search range of 2, and determining the 25 motion vectors as candidate motion vectors; wherein a searching sequence of the 25 motion vectors is as follows: {Mv(−2,−2), Mv(−1,−2), Mv(0,−2), Mv(1,−2), Mv(2,−2), Mv(−2,−1), Mv(−1,−1), Mv(0,−1), Mv(1,−1), Mv(2,−1), Mv(−2,−0), Mv(−1,−0), Mv(0,0), Mv(1,0), Mv(2,0), Mv(−2,1), Mv(−1,1), Mv(0,1), Mv(1,1), Mv(2,1), Mv(−2,2), Mv(−1,2), Mv(0,2), Mv(1,2), Mv(2,2)}.

As an example, obtaining a cost value corresponding to the initial motion vector and cost values corresponding to the candidate motion vectors according to the pixel values of the first reference block and the pixel values of the second reference block comprises: obtaining cost values corresponding to the candidate motion vectors comprises: determining first sub-reference blocks corresponding to the candidate motion vectors based on the first reference block, and determining second sub-reference blocks corresponding to the candidate motion vectors based on the second reference block; calculating a sum of absolute differences of pixel point sample values in the first sub-reference blocks and the second sub-reference blocks by using a down-sampling operation performed vertically by 2 times; determining the cost values corresponding to the candidate motion vectors according to the obtained sum of absolute differences; obtaining a cost value corresponding to the initial motion vector comprises: determining a first sub-reference block corresponding to the initial motion vector based on the first reference block, and determining a second sub-reference block corresponding to the initial motion vector based on the second reference block; calculating a sum of absolute differences of pixel point sample values in the first sub-reference block and the second sub-reference block by using a down-sampling operation performed vertically by 2 times; determining the cost value corresponding to the initial motion vector according to the obtained sum of absolute differences.

As an example, adjusting the first original motion vector and the second original motion vector according to the optimal motion vector to obtain a first target motion vector corresponding to the first original motion vector and a second target motion vector corresponding to the second original motion vector comprises: determining a first integer-pixel motion vector adjustment value and a second integer-pixel motion vector adjustment value according to the optimal motion vector; adjusting the first original motion vector according to the first integer-pixel motion vector adjustment value to obtain the first target motion vector corresponding to the first original motion vector; and adjusting the second original motion vector according to the second integer-pixel motion vector adjustment value to obtain the second target motion vector corresponding to the second original motion vector.

As an example, determining a first integer-pixel motion vector adjustment value and a second integer-pixel motion vector adjustment value according to the optimal motion vector comprises: determining the first integer-pixel motion vector adjustment value according to the optimal motion vector, wherein the first integer-pixel motion vector adjustment value is equal to the difference between the optimal motion vector and the initial motion vector; determining the second integer-pixel motion vector adjustment value according to the first integer-pixel motion vector adjustment value; wherein the second integer-pixel motion vector adjustment value and the first integer-pixel motion vector adjustment value are opposite numbers to each other.

As an example, adjusting the first original motion vector according to the first integer-pixel motion vector adjustment value to obtain the first target motion vector corresponding to the first original motion vector, and adjusting the second original motion vector according to the second integer-pixel motion vector adjustment value to obtain the second target motion vector corresponding to the second original motion vector comprises: the first target motion vector is equal to the sum of the first original motion vector and the first integer-pixel motion vector adjustment value; the second target motion vector is equal to the sum of the second original motion vector and the second integer-pixel motion vector adjustment value.

As an example, adjusting the first original motion vector and the second original motion vector according to the optimal motion vector to obtain a first target motion vector corresponding to the first original motion vector and a second target motion vector corresponding to the second original motion vector comprises: determining a first integer-pixel motion vector adjustment value, a first sub-pixel motion vector adjustment value, a second integer-pixel motion vector adjustment value and a second sub-pixel motion vector adjustment value according to the optimal motion vector; adjusting the first original motion vector according to the first integer-pixel motion vector adjustment value and the first sub-pixel motion vector adjustment value to obtain the first target motion vector of the sub-block; and adjusting the second original motion vector according to the second integer-pixel motion vector adjustment value and the second sub-pixel motion vector adjustment value to obtain the second target motion vector of the sub-block.

As an example, adjusting the first original motion vector and the second original motion vector according to the optimal motion vector to obtain a first target motion vector corresponding to the first original motion vector and a second target motion vector corresponding to the second original motion vector comprises: determining a first integer-pixel motion vector adjustment value and a first sub-pixel motion vector adjustment value according to the optimal motion vector; obtaining an optimal offset motion vector according to the first integer-pixel motion vector adjustment value and the first sub-pixel motion vector adjustment value; adjusting the first original motion vector based on the optimal offset motion vector to obtain the first target motion vector; adjusting the second original motion vector based on an opposite number of the optimal offset motion vector to obtain the second target motion vector.

As an example, determining a first integer-pixel motion vector adjustment value and a first sub-pixel motion vector adjustment value according to the optimal motion vector comprises: determining the first integer-pixel motion vector adjustment value according to the optimal motion vector, wherein the first integer-pixel motion vector adjustment value is equal to the difference between the optimal motion vector and the initial motion vector; determining the first sub-pixel motion vector adjustment value according to a cost value corresponding to the optimal motion vector and cost values corresponding to edge motion vectors corresponding to the optimal motion vector.

As an example, determining the first sub-pixel motion vector adjustment value according to a cost value corresponding to the optimal motion vector and cost values corresponding to edge motion vectors corresponding to the optimal motion vector comprises: sequentially determining cost values of 5 integer-pixel motion vectors which take the optimal motion vector as a center; wherein the 5 integer-pixel motion vectors are 5 edge motion vectors obtained by shifting horizontally to the left, horizontally to the right, vertically upward and vertically downward respectively when taking the optimal motion vector as a center.

As an example, the first target motion vector is equal to the sum of the first original motion vector, the first integer-pixel motion vector adjustment value and the first sub-pixel motion vector adjustment value; the second target motion vector is equal to the sum of the second original motion vector, the second integer-pixel motion vector adjustment value and the second sub-pixel motion vector adjustment value; wherein, the second integer-pixel motion vector adjustment value and the first integer-pixel motion vector adjustment value are opposite numbers to each other; the second sub-pixel motion vector adjustment value and the first sub-pixel motion vector adjustment value are opposite numbers to each other.

As an example, the optimal motion vector is a motion vector having a smallest cost value selected from the original motion vector and the candidate motion vectors.

As an example, when the absolute value of the first integer-pixel motion vector adjustment value in the vertical and/or horizontal direction is equal to a preset value, adjusting the first original motion vector according to the first integer-pixel motion vector adjustment value to obtain the first target motion vector corresponding to the first original motion vector.

As an example, when the absolute value of the first integer-pixel motion vector adjustment value in the vertical and/or horizontal direction is not equal to a preset value, adjusting the first original motion vector according to the first integer-pixel motion vector adjustment value and the first sub-pixel motion vector adjustment value to obtain the first target motion vector corresponding to the first original motion vector.

As an example, when the cost value corresponding to the initial motion vector is bigger than or equal to a preset threshold, implementing the step of selecting a motion vector from the initial motion vector and the candidate motion vectors as the optimal motion vector according to the cost value corresponding to the initial motion vector and the cost values corresponding to the candidate motion vectors; otherwise, the step is not implemented, wherein the preset threshold is determined according to a width and height of the sub-block.

As an example, when the current block comprises one sub-block, the sub-block is the current block itself.

As an example, the first reference block and the second reference block are luminance prediction blocks determined based on a luminance component.

As an example, the pixel values of the first reference block and the pixel values of the second reference block are both obtained by means of bilinear interpolation.

As an example, determining a first reference block corresponding to the sub-block according to the first original motion vector of the current block, and determining a second reference block corresponding to the sub-block according to the second original motion vector of the current block comprises: determining the first reference block by means of bilinear interpolation according to the first original motion vector and the first reference frame of the current block; determining the second reference block by means of bilinear interpolation according to the second original motion vector and the second reference frame of the current block; wherein the size of the first reference block is the same as the size of the second reference block, a width value of the first reference block is determined based on a width value of the sub-block and a search range, a height value of the first reference block is determined based on a height value of the sub-block and the search range.

As an example, determining a first reference block corresponding to the sub-block according to the first original motion vector of the current block, and determining a second reference block corresponding to the sub-block according to the second original motion vector of the current block comprises: obtaining a first integer-pixel block from a first reference frame of the current block according to the first original motion vector, implementing bilinear interpolation of the first integer-pixel block to obtain the first reference block; obtaining a second integer-pixel block from a second reference frame of the current block according to the second original motion vector, implementing bilinear interpolation of the second integer-pixel block to obtain the second reference block; if W is a width of the sub-block, H is a height of the sub-block, and SR is a search range, then width values of the first reference block and the second reference block both are W+2*SR, height values of the first reference block and the second reference block both are H+2*SR, wherein the value of SR is 2.

As an example, the pixel values of the third reference block and the pixel values of the fourth reference block, when weighted, have the same weight.

As an example, the pixel values of the third reference block and the pixel values of the fourth reference block are obtained based on an interpolation by an 8-tap interpolation filter.

As an example, determining a third reference block corresponding to the sub-block according to the first target motion vector and determining a fourth reference block corresponding to the sub-block according to second target motion vector comprises: determining a fifth reference block corresponding to the sub-block from the first reference frame of the current block based on the first target motion vector, and implementing an interpolation of pixel values in the fifth reference block based on an 8-tap interpolation filter to obtain the third reference block; determining a sixth reference block corresponding to the sub-block from the second reference frame based on the second target motion vector, and implementing an interpolation of pixel values in the sixth reference block based on the 8-tap interpolation filter to obtain the fourth reference block; wherein the size of the fifth reference block is bigger than the size of the sub-block, the size of the sixth reference block is bigger than the size of the sub-block, and the size comprises width and height.

As an example, the sub-block comprises a luminance component, and implementing a weighted motion compensation of the sub-block according to the first target motion vector and the second target motion vector to obtain a weighted prediction value of the sub-block comprises: for the luminance component of the sub-block, implementing a weighted motion compensation of the sub-block according to the first target motion vector and the second target motion vector to obtain a weighted prediction value of luminance of the sub-block.

As an example, the sub-block comprises a chrominance component, and implementing a weighted motion compensation of the sub-block according to the first target motion vector and the second target motion vector to obtain a weighted prediction value of the sub-block comprises: for the chrominance component of the sub-block, implementing a weighted motion compensation of the sub-block according to the first target motion vector and the second target motion vector to obtain a weighted prediction value of chrominance of the sub-block.

As an example, when the current block enables a motion vector refinement mode, characteristic information of the current block meets specific conditions, wherein the specific conditions comprise a motion information prediction mode corresponding to the current block, a motion information attribute corresponding to the current block and size information of the current block; wherein, when the current block enables a motion vector refinement mode, the conditions met by the current block at least comprise: the current block does not adopt a merge mode for encoding motion information difference values (MMVD mode), the current block adopts a merge mode, the size of the current block is within a defined range, the motion information of the current block includes motion information in two different directions, and the distances between the current frame and each of two reference frames corresponding to the motion information in two different directions are the same.

As an example, if the current block does not meet any one of the following conditions, the current block does not enable a motion vector refinement mode: the current block does not adopt a merge mode for encoding motion information difference values (MMVD mode), the current block adopts a merge mode, the size of the current block is within a defined range, the motion information of the current block includes motion information in two different directions, and the distances between the current frame and each of two reference frames corresponding to the motion information in two different directions are the same.

As an example, the distance between the current frame of the current block and the first reference frame is the same as the distance between the current frame of the current block and the second reference frame.

As an example, when the current block comprises one sub-block, the sub-block is the current block itself, and the first original motion vector and the second original motion vector are original motion vectors of the current block in two different directions.

As an example, when the current block comprises a plurality of sub-blocks, each of the plurality of sub-blocks, the first original motion vector and the second original motion vector share original motion vectors of the current block in two different directions.

According to another aspect, the present application provides an encoding method, comprising: when a current block enables a motion vector refinement mode, determining prediction values of sub-blocks of the current block, and determining a prediction value of the current block according to the prediction values of sub-blocks of the current block, wherein for each sub-block of the current block, determining a prediction value of a sub-block comprises: obtaining motion information of the current block comprising a first original motion vector and a first reference frame, a second original motion vector and a second reference frame; determining a first reference block corresponding to the sub-block according to the first original motion vector of the current block, and determining a second reference block corresponding to the sub-block according to the second original motion vector of the current block; obtaining an optimal motion vector according to pixel values of the first reference block and pixel values of the second reference block, wherein obtaining optimal motion vector comprises: taking an initial motion vector as a center, selecting motion vectors from the motion vectors containing the initial motion vector and the motion vectors surrounding the initial motion vector, and determining the selected motion vectors as candidate motion vectors; wherein the initial motion vector is the first original motion vector or the second original motion vector; obtaining a cost value corresponding to the initial motion vector and cost values corresponding to the candidate motion vectors according to the pixel values of the first reference block and the pixel values of the second reference block; selecting a motion vector from the initial motion vector and the candidate motion vectors as the optimal motion vector according to the cost value corresponding to the initial motion vector and the cost values corresponding to the candidate motion vectors; adjusting the first original motion vector and the second original motion vector according to the optimal motion vector to obtain a first target motion vector corresponding to the first original motion vector and a second target motion vector corresponding to the second original motion vector; determining the prediction value of the sub-block according to the first target motion vector and the second target motion vector; wherein determining the prediction value of the sub-block according to the first target motion vector and the second target motion vector comprises: determining a third reference block corresponding to the sub-block according to the first target motion vector, and determining a fourth reference block corresponding to the sub-block according to second target motion vector; weighting pixel values of the third reference block and pixel values of the fourth reference block to obtain the prediction value of the sub-block.

According to another aspect, the present application provides a decoding apparatus, comprising: a processor and a machine-readable storage medium, wherein the machine-readable storage medium has stored thereon machine-executable instructions executable by the processor; the processor is used to execute machine-executable instructions so as to implement the method as aforementioned.

According to another aspect, the present application provides an encoding apparatus, comprising: a processor and a machine-readable storage medium, wherein the machine-readable storage medium has stored thereon machine-executable instructions executable by the processor; the processor is used to execute machine-executable instructions so as to implement the following steps: when a current block enables a motion vector refinement mode, determining prediction values of sub-blocks of the current block, and determining a prediction value of the current block according to the prediction values of sub-blocks of the current block, wherein for each sub-block of the current block, determining a prediction value of a sub-block comprises: obtaining motion information of the current block comprising a first original motion vector and a first reference frame, a second original motion vector and a second reference frame; determining a first reference block corresponding to the sub-block according to the first original motion vector of the current block, and determining a second reference block corresponding to the sub-block according to the second original motion vector of the current block; obtaining an optimal motion vector according to pixel values of the first reference block and pixel values of the second reference block, wherein obtaining an optimal motion vector comprises: taking an initial motion vector as a center, selecting motion vectors from the motion vectors containing the initial motion vector and the motion vectors surrounding the initial motion vector, and determining the selected motion vectors as candidate motion vectors; wherein the initial motion vector is the first original motion vector or the second original motion vector; obtaining a cost value corresponding to the initial motion vector and cost values corresponding to the candidate motion vectors according to the pixel values of the first reference block and the pixel values of the second reference block; selecting a motion vector from the initial motion vector and the candidate motion vectors as the optimal motion vector according to the cost value corresponding to the initial motion vector and the cost values corresponding to the candidate motion vectors; adjusting the first original motion vector and the second original motion vector according to the optimal motion vector to obtain a first target motion vector corresponding to the first original motion vector and a second target motion vector corresponding to the second original motion vector; determining the prediction value of the sub-block according to the first target motion vector and the second target motion vector; wherein determining the prediction value of the sub-block according to the first target motion vector and the second target motion vector comprises: determining a third reference block corresponding to the sub-block according to the first target motion vector, and determining a fourth reference block corresponding to the sub-block according to second target motion vector; weighting pixel values of the third reference block and pixel values of the fourth reference block to obtain the prediction value of the sub-block.

According to another aspect, the present application provides a decoder, wherein the decoder is configured to implement the method as aforementioned.

According to another aspect, the present application provides an encoder, wherein the encoder is configured to implement the following steps: when a current block enables a motion vector refinement mode, determining prediction values of sub-blocks of the current block, and determining a prediction value of the current block according to the prediction values of sub-blocks of the current block, wherein for each sub-block of the current block, determining a prediction value of a sub-block comprises: obtaining motion information of the current block comprising a first original motion vector and a first reference frame, a second original motion vector and a second reference frame; determining a first reference block corresponding to the sub-block according to the first original motion vector of the current block, and determining a second reference block corresponding to the sub-block according to the second original motion vector of the current block; obtaining an optimal motion vector according to pixel values of the first reference block and pixel values of the second reference block, wherein obtaining an optimal motion vector comprises: taking an initial motion vector as a center, selecting motion vectors from the motion vectors containing the initial motion vector and the motion vectors surrounding the initial motion vector, and determining the selected motion vectors as candidate motion vectors; wherein the initial motion vector is the first original motion vector or the second original motion vector; obtaining a cost value corresponding to the initial motion vector and cost values corresponding to the candidate motion vectors according to the pixel values of the first reference block and the pixel values of the second reference block; selecting a motion vector from the initial motion vector and the candidate motion vectors as the optimal motion vector according to the cost value corresponding to the initial motion vector and the cost values corresponding to the candidate motion vectors; adjusting the first original motion vector and the second original motion vector according to the optimal motion vector to obtain a first target motion vector corresponding to the first original motion vector and a second target motion vector corresponding to the second original motion vector; determining the prediction value of the sub-block according to the first target motion vector and the second target motion vector; wherein determining the prediction value of the sub-block according to the first target motion vector and the second target motion vector comprises: determining a third reference block corresponding to the sub-block according to the first target motion vector, and determining a fourth reference block corresponding to the sub-block according to second target motion vector; weighting pixel values of the third reference block and pixel values of the fourth reference block to obtain the prediction value of the sub-block.

According to another aspect, the present application provides a non-transitory machine-readable storage medium, comprising machine-executable instructions executable by a processor stored thereon; the processor is used to execute the machine-executable instructions to implement the method as aforementioned.

It can be seen from the above technical solutions that in the embodiment of the present application, the first and second target motion vectors of the current block can be determined according to the first and second original motion vectors, and the current block can be encoded or decoded according to the first and second target motion vectors, instead of directly encoding or decoding the current block according to the first and second original motion vectors, so as to solve problems such as low prediction quality, prediction error, and the like, and improve the encoding performance and the encoding efficiency.

BRIEF DESCRIPTION OF THE DRAWINGS

In order to more clearly explain the technical solution in the embodiment of this application or of the prior art, drawings that need to be used in embodiments and the prior art will be briefly described below. Obviously, the drawings provided below are for only some embodiments of the present application; those skilled in the art can also obtain other drawings based on these drawings.

FIG. 1A is a schematic diagram of interpolation according to an embodiment of the present application;

FIG. 1B is a schematic diagram of a video encoding framework according to an embodiment of the present application;

FIG. 2 is a flowchart of an encoding and decoding method according to an embodiment of the present application;

DETAILED DESCRIPTION

Figure 3:
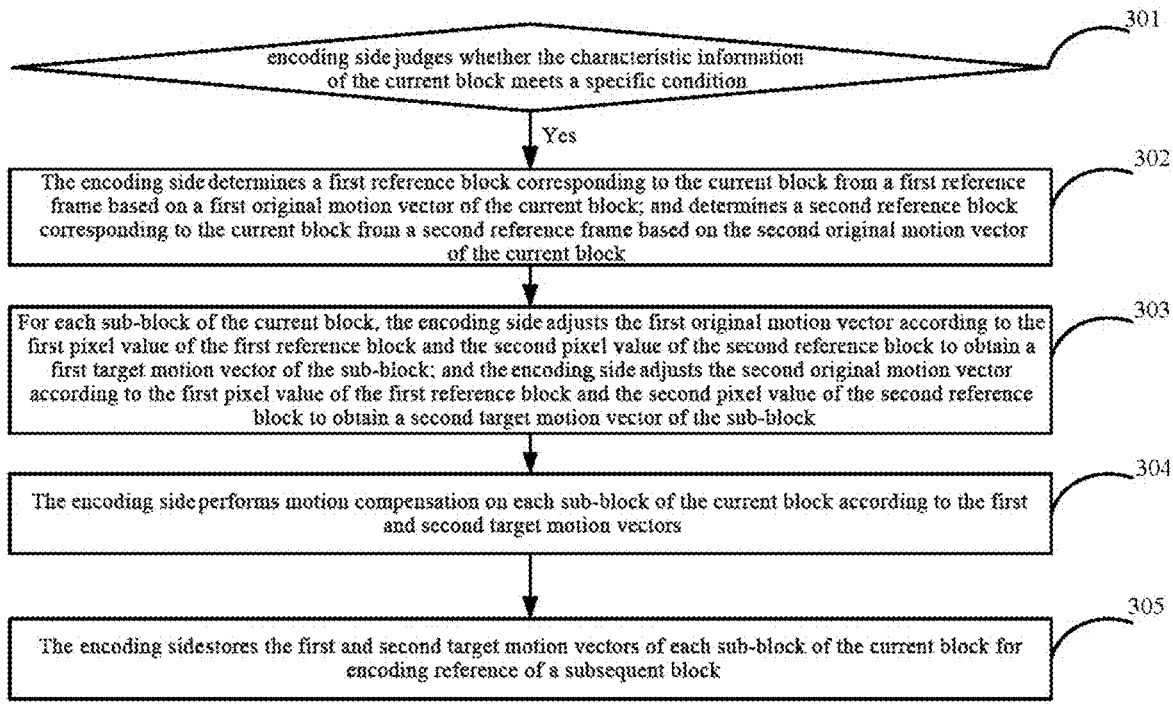
FIG. 3 is a flowchart of an encoding and decoding method according to an embodiment of the present application.

The terms used in the embodiments of the present application are only for the purpose of describing specific embodiments, not intended to limit the present application. In this application, unless otherwise specified and/or unless the particular context clearly dictates otherwise, the terms "a" or "an" mean at least one, and the term "the" means the at least one. It should be understood that the term "and/or" used herein is meant to encompass any and all possible combinations of one or more of the associated listed items.

It should be understood that although the terms first, second, third, etc. may be used herein to describe various elements, the elements should not be limited to these terms. These terms are only used to distinguish one type of elements from another. For example, first element can also be referred to as second element, and similarly, second element may also be referred to as first element, without departing from the scope of the present application. The word "if" used can be interpreted as "at . . . " or "when . . . " or "in response to determining", depending on the context.

The embodiment of this application provides an encoding and decoding method, which may relate to the following concepts:

Intra-frame prediction and inter-frame prediction techniques: the intra-frame prediction technique is to use the pixels of the coded block of the current image to predict current pixels according to the spatial correlation of a video, so as to effectively remove the video spatial domain redundancy. In the intra-frame prediction technique, a plurality of prediction modes are defined, each of which corresponds to one texture direction (except for the DC mode), and the prediction signal of a current block is generated from a boundary reconstructed pixel value of a block adjacent to the current block in the prediction direction. For example, if the texture of the image is horizontally arranged, the image information can be better predicted by selecting the horizontal prediction mode. Since a video sequence usually contains stronger time domain correlation, the inter-frame prediction technique is to use the pixels of the adjacent encoded image to predict the current pixels of the current image according to the time domain correlation of the video, so as to effectively remove the video time domain redundancy. The inter-frame prediction section of the main video encoding standard adopts a block-based motion compensation technology, and the main principle is to find an optimal matching block in a previously encoded image for each pixel block of a current image, which is called Motion Estimation (ME).

Motion Vector (MV): in inter encoding, motion vectors are used to indicate the relative displacement between the current encoding block and the optimal matching block in its reference image. Each divided block has a corresponding motion vector transmitted to a decoding side, and if the motion vector of each block, particularly divided into small-sized blocks, is independently encoded and transmitted, a considerable number of bits are consumed. In order to reduce the number of bits for encoding the motion vector, the spatial correlation between adjacent image blocks is used to predict the motion vector of the current block to be encoded according to the motion vector of the adjacent encoded block, and then the prediction difference is encoded. Thus, the number of bits representing the motion vector can be effectively reduced. In the process of encoding the motion vector of the current block, the motion vector of the current block is predicted by using the motion vector of the adjacent encoded block, and then the Motion Vector Difference (MVD) between the Motion Vector Prediction (MVP) and the real estimated value of the motion vector is encoded, so that the number of encoding bits of the MV is effectively reduced.

Motion Information: since the motion vector indicates the displacement between the current image block and a certain reference image block, in order to accurately acquire information pointing to the image block, index information of the reference frame image is required in addition to the motion vector to indicate which reference frame image is used. In the video encoding technology, for a current frame image, a reference frame image list may be generally established, and index information of the reference frame image indicates which reference frame image in the reference frame image list is adopted by the current image block. In addition, many encoding techniques also support multiple reference image lists, and therefore, an index value, which may be referred to as a reference direction, may also be used to indicate which reference image list is used. In the video encoding technology, information related to motion, such as a motion vector, a reference frame index, and a reference direction, may be collectively referred to as motion information.

Prediction Signal: the prediction signal is a pixel value derived from a pixel which is already encoded and decoded, a residual is obtained through the difference between an original pixel and the predicted pixel, and then the residual is transformed and quantized, and the coefficients are encoded. In particular, the inter-frame prediction signal refers to a pixel value derived from a reference frame (reconstructed pixel frame) of the current block, and the final predicted pixel needs to be obtained through an interpolation due to the discrete pixel position. The closer the predicted pixel is to the original pixel, the smaller the residual energy obtained by subtracting the predicted pixel from the original pixel is, and the higher the encoding compression performance is.

Interpolation: if the current MV is non-integer pixel precision, the existing pixel value cannot be directly copied from the corresponding reference frame, and the required pixel value can only be obtained through interpolation. As shown in FIG. 1A, if a pixel value Y½ with an offset of ½ pixels is to be obtained, it needs to be obtained by interpolating the surrounding existing pixel values X. If an interpolation filter with the number of taps being N is adopted, the interpolation is obtained by interpolating N surrounding integer-pixels.

Motion compensation: motion compensation is the process of obtaining all the pixel values of the current block by interpolation or copying.

Video encoding framework: as shown in FIG. 1B, the encoding side processing flow according to the embodiment of the present application may be implemented by using the video encoding framework, and in addition, the schematic diagram of the video decoding framework is similar to that of FIG. 1B, which is not described herein either, and the decoding side processing flow according to the embodiment of the present application may be implemented by using a video decoding framework. Specifically, the video encoding framework and the video decoding framework include modules, such as modules of intra-frame prediction, motion estimation/motion compensation, reference image buffer, in-loop filtering, reconstruction, transformation, quantization, inverse transformation, inverse quantization, entropy encoder and the like. At the encoding side, the processing flow at the encoding side can be realized through the cooperation between these modules, and at the decoding side, the processing flow at the decoding side can be realized through the cooperation between these modules.

In the conventional method, when a current block is a bi-directional block, there is no reasonable solution that how to adjust the first and second original motion vectors after obtaining the first and second original motion vectors of the current block. In the embodiment of the application, when a current block is a bi-directional block, firstly whether the characteristic information of the current block meets a specific condition is judged, if yes, a first reference block corresponding to the current block is determined according to a first original motion vector, a second reference block is determined according to a second original motion vector of the current block, and the first and second original motion vectors are adjusted according to a first pixel value of the first reference block and a second pixel value of the second reference block to obtain first and second target motion vectors.

In this way, the first and second target motion vectors are obtained by adjusting the first and second original motion vectors, so that the current block can be encoded or decoded according to the first and second target motion vectors, and the encoding performance and the encoding efficiency can be improved.

The following describes the encoding and decoding method according to the present application in detail with reference to several specific embodiments.

Embodiment 1 referring to FIG. 2, a schematic flow chart of an encoding and decoding method according to an embodiment of the present application is shown, where the method can be applied to a decoding side or an encoding side, and the method can include the following steps:

At step 201, if characteristic information of a current block meets a specific condition, a first reference block corresponding to the current block is determined according to a first original motion vector of the current block, and a second reference block corresponding to the current block is determined according to a second original motion vector of the current block. The characteristic information includes, but is not limited to, one or more of the following: a motion information prediction mode corresponding to the current block; a motion information attribute corresponding to the current block; size information of the current block.

In an example, when the characteristic information is the motion information prediction mode corresponding to the current block, the characteristic information of the current block meets a specific condition, can include but is not limited to: if the motion information prediction mode corresponding to the current block is a regular merge mode, determining that the motion information prediction mode corresponding to the current block meets the specific condition; or, if the motion information prediction mode corresponding to the current block is a merge mode for generating a new prediction value by combining an inter-frame prediction value and an intra-frame prediction value, determining that the motion information prediction mode corresponding to the current block meets the specific condition.

In an example, when the characteristic information is a motion information attribute corresponding to the current block, the characteristic information of the current block meets a specific condition, can include but is not limited to: if the motion information attribute corresponding to the current block is that the motion information of the current block includes motion information in two different directions, determining that the motion information attribute corresponding to the current block meets the specific condition; or, if the motion information attribute corresponding to the current block is that the motion information of the current block includes motion information in two different directions, and the distances between the current frame and each of two reference frames corresponding to the motion information in the two different directions are the same, determining that the motion information attribute corresponding to the current block meets the specific condition; or if the motion information attribute corresponding to the current block is that the current block reuses motion information of surrounding blocks, determining that the motion information attribute corresponding to the current block meets the specific condition; or, if the motion information attribute corresponding to the current block is that motion information of each sub-block of the current block is the same, determining that the motion information attribute corresponding to the current block meets the specific condition.

Exemplarily, the motion information of the current block includes motion information in two different directions, which means that: the motion information of the current block in two different directions respectively corresponds to a first reference frame and a second reference frame, the first reference frame is located in front of the current frame where the current block is located, and the second reference frame is located behind the current frame where the current block is located.

In an example, when the characteristic information is size information of the current block, the size information of the current block can include a width value and a height value of the current block, the characteristic information of the current block meets a specific condition, can include but is not limited to: if the width value of the current block is within a range of a first interval [a first threshold, a second threshold], determining that the size information of the current block meets the specific condition; or, if the height value of the current block is within a range of a second interval [a third threshold, a fourth threshold], determining that the size information of the current block meets the specific condition; or, if the area derived from the width value and the height value of the current block is within a range of a third interval [a fifth threshold, a sixth threshold], determining that the size information of the current block meets the specific condition; or, if the width value is within the range of the first interval [the first threshold, the second threshold], the height value is within the range of the second interval [the third threshold, the fourth threshold], and the area is within the range of the third interval [the fifth threshold, the sixth threshold], determining that the size information of the current block meets the specific condition.

Exemplarily, the first threshold may be smaller than the second threshold, and neither the first threshold nor the second threshold is limited, for example, the first threshold may be 4, and the second threshold may be 128. The third threshold may be smaller than the fourth threshold, and neither the third threshold nor the fourth threshold is limited, for example, the third threshold may be 8, and the fourth threshold may be 128. The fifth threshold may be smaller than the sixth threshold, and neither the fifth threshold nor the sixth threshold is limited, for example, the fifth threshold may be 64, and the sixth threshold may be 128*128.

In an example, determining the first reference block corresponding to the current block according to the first original motion vector of the current block, and determining the second reference block corresponding to the current block according to the second original motion vector of the current block can include, but are not limited to: determining the first reference block corresponding to the current block from the first reference frame based on the first original motion vector of the current block; and determining the second reference block corresponding to the current block from the second reference frame based on the second original motion vector of the current block. The first pixel value of each pixel point in the first reference block is obtained by interpolating the pixel values of adjacent pixel points in the first reference block, or is obtained by copying the pixel values of the adjacent pixel points in the first reference block; the second pixel value of each pixel point in the second reference block is obtained by interpolating the pixel values of adjacent pixel points in the second reference block, or is obtained by copying the pixel values of adjacent pixel points in the second reference block. The size of the first reference block is the same as the size of the second reference block, the width value of the first reference block is determined based on the width value of the current block and the search range, and the height value of the first reference block is determined based on the height value of the current block and the search range.

At step 202, the first and second original motion vectors are adjusted according to the first pixel value of the first reference block and the second pixel value of the second reference block, to obtain the first target motion vector corresponding to the first original motion vector and the second target motion vector corresponding to the second original motion vector.

In an example, when the current block includes at least one sub-block, for each sub-block of the current block, the first and second original motion vectors are adjusted according to the first and second pixel values to obtain the first and second target motion vectors of the sub-block.

In an example, adjusting the first and second original motion vectors according to the first and second pixel values to obtain the first and second target motion vectors of the sub-block can include: first and second integer-pixel motion vector adjustment values of the sub-block, and/or first and second sub-pixel motion vector adjustment values of the sub-block can be determined according to the first and second pixel values. Then, the first original motion vector can be adjusted according to the first integer-pixel motion vector adjustment value and/or the first sub-pixel motion vector adjustment value, so as to obtain the first target motion vector of the sub-block. And the second original motion vector can be adjusted according to the second integer-pixel motion vector adjustment value and/or the second sub-pixel motion vector adjustment value, so as to obtain the second target motion vector of the sub-block.

In an example, determining the first and second integer-pixel motion vector adjustment values of the sub-block, the first and second sub-pixel motion vector adjustment values of the sub-block according to the first and second pixel values can include: determining the first original motion vector or the second original motion vector as a center motion vector; determining an edge motion vector corresponding to the center motion vector; obtaining a first cost value corresponding to the center motion vector and a second cost value corresponding to the edge motion vector according to the first and second pixel values; then selecting a motion vector from the center motion vector and the edge motion vector as an optimal motion vector according to the first cost value and the second cost value, and judging whether an end condition is met; if not, determining the optimal motion vector as the center motion vector, and returning to execute determining the edge motion vector corresponding to the center motion vector; if yes, determining the first and second integer-pixel motion vector adjustment values of the sub-block according to the optimal motion vector; and determining the first and second sub-pixel motion vector adjustment values of the sub-block according to the optimal motion vector.

In an example, determining the edge motion vector corresponding to the center motion vector includes: shifting the center motion vector (x,y) towards different directions by S, and sequentially obtaining edge motion vector (x,y+S), edge motion vector (x,y−S), edge motion vector (x+S,y), edge motion vector (x−S,y) and edge motion vector (x+right,y+down) in different directions, or shifting the center motion vector (x,y) towards different directions by S, and sequentially obtaining edge motion vector (x,y−S), edge motion vector (x,y+S), edge motion vector (x−S,y), edge motion vector (x+S,y) and edge motion vector (x+ right, y+ down) in different directions. The default value of the edge motion vector (x+ right, y+ down) is (x−S,y−S); if the cost value of the edge motion vector (x+S,y) is smaller than the cost value of the edge motion vector (x−S,y), right is S; if the cost value of the edge motion vector (x,y+S) is less than that of the edge motion vector (x,y−S), down is S; or if the cost value of the edge motion vector (x+S,y) is less than or equal to the cost value of the edge motion vector (x−S,y), right is S; if the cost value of the edge motion vector (x,y+S) is less than or equal to the cost value of the edge motion vector (x,y−S), down is S.

In an example, obtaining the first cost value corresponding to the center motion vector and the second cost value corresponding to the edge motion vector according to the first and second pixel values can include, but is not limited to: acquiring the first cost value corresponding to the center motion vector and the second cost value corresponding to the edge motion vector according to the first and second pixel values without down-sampling; alternatively, can include performing down-sampling operation on the first and second pixel values; and obtaining the first cost value corresponding to the center motion vector and the second cost value corresponding to the edge motion vector according to the first and second pixel values after down-sampling; alternatively, can include performing shifting and down-sampling operation on the first pixel value, and performing shifting and down-sampling operation on the second pixel value; and acquiring the first cost value corresponding to the center motion vector and the second cost value corresponding to the edge motion vector according to the first and second pixel values after shifting and down-sampling.

In an example, determining the first and second integer-pixel motion vector adjustment values of the sub-block, the first and second sub-pixel motion vector adjustment values of the sub-block according to the first and second pixel values can include: taking the first original motion vector or the second original motion vector as a center, selecting some or all of the motion vectors from surrounding motion vectors, and taking the selected motion vectors as candidate motion vectors; acquiring a third cost value corresponding to the first original motion vector or the second original motion vector and a fourth cost value corresponding to each of the candidate motion vectors according to the first and second pixel values; then selecting a motion vector from the first original motion vector or the second original motion vector and the candidate motion vector as an optimal motion vector according to the third cost value and the fourth cost value; determining the first and second integer-pixel motion vector adjustment values of the sub-block according to the optimal motion vector; and determining the first and second sub-pixel motion vector adjustment values of the sub-block according to the optimal motion vector.

Determining the first and second integer-pixel motion vector adjustment values of the sub-block according to the optimal motion vector can include, but is not limited to: determining the first integer-pixel motion vector adjustment value of the sub-block according to the optimal motion vector and the first original motion vector, and determining the second integer-pixel motion vector adjustment value of the sub-block according to the first integer-pixel motion vector adjustment value.

Determining the first and second sub-pixel motion vector adjustment values of the sub-block according to the optimal motion vector, can include: determining the first sub-pixel motion vector adjustment value of the sub-block according to the cost value corresponding to the optimal motion vector and the cost value corresponding to the edge motion vector corresponding to the optimal motion vector, and determining the second sub-pixel motion vector adjustment value of the sub-block according to the first sub-pixel motion vector adjustment value.

At step 203, the current block is encoded or decoded according to the first and second target motion vectors. For example, referring to the encoding side, the encoding side can encode the current block according to the first and second target motion vectors; referring to the decoding side, the decoding side can decode the current block according to the first and second target motion vectors.

In an example, for each sub-block of the current block, a third reference block corresponding to the sub-block is determined according to the first target motion vector of the sub-block, and a fourth reference block corresponding to the sub-block is determined according to the second target motion vector of the sub-block; a third pixel value of the third reference block and a fourth pixel value of the fourth reference block are weighted to obtain a prediction value of the sub-block; and the prediction value of the current block is determined according to the prediction value of each sub-block.

In an example, determining the third reference block corresponding to the sub-block according to the first target motion vector of the sub-block, and determining the fourth reference block corresponding to the sub-block according to the second target motion vector of the sub-block can include:

implementation 1: determining a fifth reference block corresponding to the sub-block from the first reference frame based on the first target motion vector of the sub-block, and interpolating pixel values in the fifth reference block to obtain the third reference block. And determining a sixth reference block corresponding to the sub-block from the second reference frame based on the second target motion vector of the sub-block, and interpolating pixel values in the sixth reference block to obtain the fourth reference block.

implementation 2: determining a seventh reference block corresponding to the sub-block from the first reference frame based on the first target motion vector of the sub-block, constructing an eighth reference block by using pixel values in the seventh reference block, and interpolating pixel values in the eighth reference block to obtain the third reference block; and determining a ninth reference block corresponding to the sub-block from the second reference frame based on the second target motion vector of the sub-block, constructing a tenth reference block by using pixel values in the ninth reference block, and interpolating pixel values in the tenth reference block to obtain the fourth reference block.

In an example, after encoding or decoding the current block according to the first and second target motion vectors, the first and second target motion vectors for the current block can be further stored. In this way, the first and second target motion vectors are used for loop filtering of the current frame, the first and second target motion vectors are used for time domain reference of subsequent frames, and/or the first and second target motion vectors are used for spatial domain reference of the current frame.

As can be seen from the above technical solutions, in the embodiment of the present application, the first and second target motion vectors of the current block can be determined according to the first and second original motion vectors, and the current block can be encoded or decoded according to the first and second target motion vectors, instead of being encoded or decoded directly according to the first and second original motion vectors, so as to solve problems such as low prediction quality, prediction error, and the like, and improve the encoding performance and the encoding efficiency.

Embodiment 2 referring to FIG. 3, a schematic flow chart of an encoding and decoding method according to an embodiment of the present application is shown, where the encoding and decoding method can be applied to an encoding side, and the encoding and decoding method can include the following steps:

At step 301, the encoding side judges whether the characteristic information of the current block meets a specific condition. If the characteristic information of the current block meets the specific condition, step 302 is executed; and if the characteristic information of the current block does not meet the specific condition, the motion vector adjustment method according to the present application is not required to be adopted, and the processing method is not limited.

In an example, the encoding side can judge whether the characteristic information of the current block meets the specific condition based on the encoded information. If the characteristic information of the current block meets the specific condition, it indicates that the motion information of the current block is not accurate enough, and therefore, the motion vector refinement mode is enabled, and step 302 is performed.

If the characteristic information of the current block does not meet the specific condition, it indicates that the motion information of the current block is accurate enough, the motion vector refinement mode is thus not enabled, and the motion vector refinement mode according to the present application is not needed.

In an example, the characteristic information of the current block includes, but is not limited to, one or more of the following: the motion information prediction mode corresponding to the current block; the motion information attribute corresponding to the current block; size information of the current block.

For the method of judging whether the characteristic information of the current block meets the specific condition, refer to the following embodiments.

At step 302, the encoding side determines a first reference block corresponding to the current block from a first reference frame based on a first original motion vector of the current block; and determines a second reference block corresponding to the current block from a second reference frame based on the second original motion vector of the current block. The pixel value of each pixel point in the first reference block is referred to as a first pixel value, and the pixel value of each pixel point in the second reference block is referred to as a second pixel value for distinguishing.

In an example, if the current block is a block using bi-directional prediction, then the current block has bi-directional motion information including two reference frames and two original motion vectors. For example, the encoding side can acquire the bi-directional motion information in a conventional method, which method is not limited. The bi-directional motion information includes a first reference frame and a first original motion vector, a second reference frame and a second original motion vector.

The encoding side can determine the first reference block corresponding to the current block from the first reference frame based on the first original motion vector, and the pixel value of each pixel point in the first reference block can be referred to as the first pixel value.

The encoding side can determine the second reference block corresponding to the current block from the second reference frame based on the second original motion vector, and the pixel value of each pixel point in the second reference block can be referred to as the second pixel value.

In an example, the distance between the current frame where the current block is located and the first reference frame, and the distance between the second reference frame and the current frame where the current block is located may be the same. For example, the first reference frame is the 1st frame, the current frame is the 5th frame, and the second reference frame is the 9th frame. Obviously, the above is only an example, and the two distances can also be different.

The first and second original motion vectors are configured in symmetrically mirrored relation with one another, e.g., the first original motion vector is (4,4), and the second original motion vector is (−4,−4); the first original motion vector is (2.5, 3.5) and the second original motion vector is (−2.5, −3.5). Obviously, the above is only an example, and there may be no symmetrically mirrored relation between the first and second original motion vectors.

For the method of determining the first and second reference blocks, refer to the following embodiments.

At step 303, for each sub-block of the current block: the encoding side adjusts the first original motion vector according to the first pixel value of the first reference block and the second pixel value of the second reference block to obtain a first target motion vector of the sub-block; and the encoding side adjusts the second original motion vector according to the first pixel value of the first reference block and the second pixel value of the second reference block to obtain a second target motion vector of the sub-block.

In an example, if the motion vector refinement mode is enabled for the current block, the encoding side can perform fine adjustment on the first and second original motion vectors by using a local search method based on the first and second pixel values to obtain better first target motion vector and second target motion vector, and then generate a prediction value with less distortion by using the first and second target motion vectors.

In an example, the current block can include at least one sub-block, and if only one sub-block is included, the sub-block is the current block itself. For the sub-block, the sub-block corresponds to the first and second original motion vectors, and after adjustment, the sub-block corresponds to the first and second target motion vectors.

If the current block includes a sub-block A and a sub-block B, for the sub-block A, the sub-block A corresponds to a first original motion vector A1 and a second original motion vector A2, and after adjustment, the sub-block A corresponds to a first target motion vector A3 and a second target motion vector A4. For the sub-block B, the sub-block B corresponds to a first original motion vector B1 and a second original motion vector B2, and after adjustment, the sub-block B corresponds to a first target motion vector B3 and a second target motion vector B4.

The first original motion vector A1 corresponding to the sub-block A and the first original motion vector B1 corresponding to the sub-block B may be the same, and are both the first original motion vectors of the current block; the second original motion vector A2 corresponding to the sub-block A and the second original motion vector B2 corresponding to the sub-block B may be the same, and are both the second original motion vectors of the current block.

Since the first original motion vectors of each sub-block are adjusted separately, the first target motion vector A3 corresponding to the sub-block A and the first target motion vector B3 corresponding to the sub-block B may be the same or different. Since the second original motion vectors of each sub-block is adjusted separately, the second target motion vector A4 corresponding to the sub-block A and the second target motion vector B4 corresponding to the sub-block B may be the same or different.

For the method of adjusting the original motion vectors, refer to the following embodiments, which are not described herein in detail.

At step 304, the encoding side performs motion compensation on each sub-block of the current block according to the first and second target motion vectors. For example, if the current block includes a sub-block A and a sub-block B, the first and second target motion vectors of the sub-block A can be used to perform motion compensation on the sub-block A, and the first and second target motion vectors of the sub-block B can be used to perform motion compensation on the sub-block B.

For the motion compensation method, refer to the following embodiments, which are not described herein in detail.

At step 305, the encoding side stores the first and second target motion vectors of each sub-block of the current block, and the first and second target motion vectors are used for encoding reference of a subsequent block.

For the implementation of the encoding reference, refer to the following embodiments, which are not described herein in detail.

Figure 4:
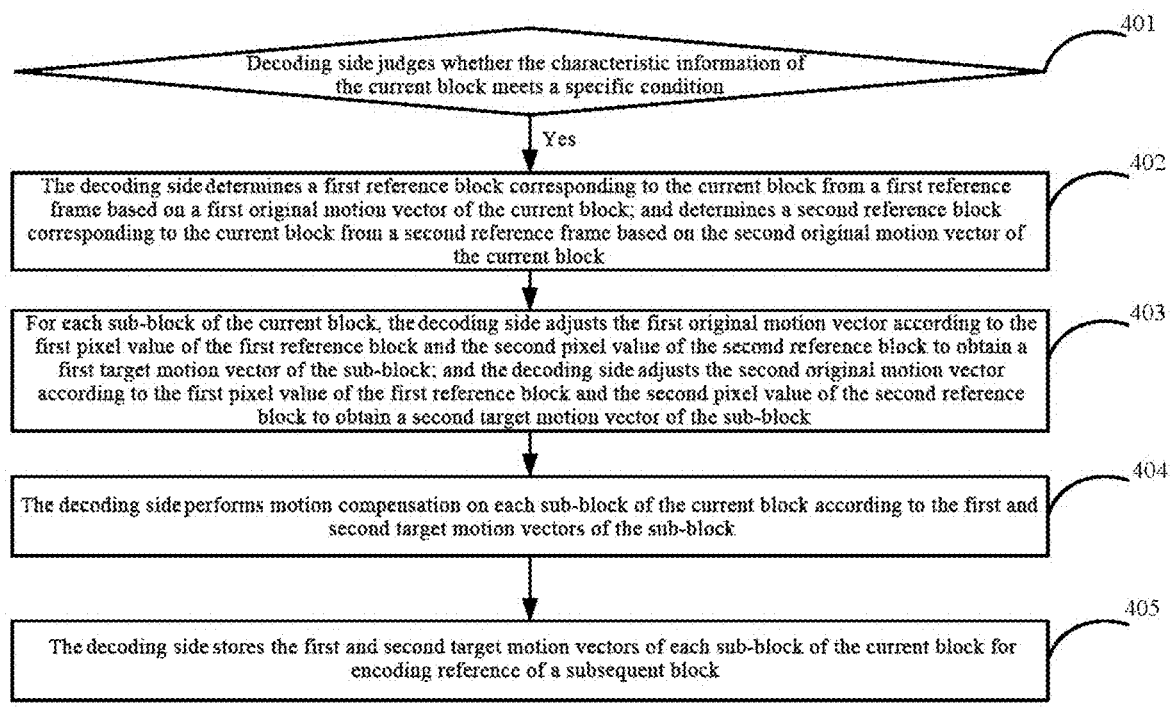
FIG. 4 is a flowchart of an encoding and decoding method according to an embodiment of the present application.

Embodiment 3 referring to FIG. 4, a schematic flow chart of an encoding and decoding method according to an embodiment of the present application is shown, where the encoding and decoding method can be applied to a decoding side, and the encoding and decoding method can include the following steps:

at step 401, the decoding side judges whether the characteristic information of the current block meets a specific condition. If the characteristic information of the current block meets the specific condition, step 402 is executed, and if the characteristic information of the current block does not meet the specific condition, the motion vector adjustment method according to the present application is not required to be adopted, and the processing method is not limited.

In an example, the decoding side can receive encoded bitstream sent by the encoding side and determine whether the characteristic information of the current block meets the specific condition based on decoded information. If the characteristic information of the current block meets the specific condition, it indicates that the motion information of the current block is not accurate enough, and therefore, the motion vector refinement mode is enabled, and step 402 is performed. If the characteristic information of the current block does not meet the specific condition, it indicates that the motion information of the current block is accurate enough, the motion vector refinement mode is thus not enabled, and the motion vector refinement mode according to the present application is not needed.

At step 402, the decoding side determines a first reference block corresponding to the current block from a first reference frame based on a first original motion vector of the current block; and determines a second reference block corresponding to the current block from a second reference frame based on the second original motion vector of the current block. The pixel value of each pixel point in the first reference block is referred to as a first pixel value, and the pixel value of each pixel point in the second reference block is referred to as a second pixel value for distinguishing.

At step 403, for each sub-block of the current block: the decoding side adjusts the first original motion vector according to the first pixel value of the first reference block and the second pixel value of the second reference block to obtain a first target motion vector of the sub-block; and the decoding side adjusts the second original motion vector according to the first pixel value of the first reference block and the second pixel value of the second reference block to obtain a second target motion vector of the sub-block.

At step 404, the decoding side performs motion compensation on each sub-block of the current block according to the first and second target motion vectors of the sub-block.

At step 405, the decoding side stores the first and second target motion vectors of each sub-block of the current block, and the first and second target motion vectors are used for encoding reference of a subsequent block.

Embodiment 4 step 301 and step 401 involve judging whether the characteristic information of the current block meets a specific condition. In this embodiment, when the characteristic information meets all of the following conditions, it is determined that the characteristic information of the current block meets the specific condition, and the motion vector refinement mode is enabled. Otherwise, the motion vector refinement mode is not enabled.

The motion information attribute corresponding to the current block includes: the current block directly multiplexing motion information of surrounding blocks without encoding a motion information difference. The motion information attribute corresponding to the current block includes: the motion information of each sub-block of the current block being the same, i.e., not adopting the sub-block motion information prediction mode. The motion information attribute corresponding to the current block includes: the motion information of the current block including motion information in two different directions. The size information of the current block includes: the size of the current block being within a defined range, which will be described in following embodiments.

Embodiment 5 step 301 and step 401 involve judging whether the characteristic information of the current block meets a specific condition. In this embodiment, when the characteristic information meets all of the following conditions, it is determined that the characteristic information of the current block meets the specific condition, and the motion vector refinement mode is enabled. Otherwise, the motion vector refinement mode is not enabled.

The motion information prediction mode corresponding to the current block adopts a Regular merge mode or a CIIP mode (namely a merge mode for generating a new prediction value by combining the inter-frame prediction value and the intra-frame prediction value); alternatively, the motion information prediction mode corresponding to the current block does not adopt a MMVD mode (i.e., a merge mode for encoding motion information difference values), a SB Merge mode (i.e., a merge mode for using sub-block motion information), or a TPM mode (i.e., a merge mode for triangle prediction).

The motion information attribute corresponding to the current block includes: the motion information of the current block includes motion information in two different directions, and the distances between the current frame and each of two reference frames corresponding to the motion information in the two different directions are the same. The size information of the current block includes: the size of the current block is within a defined range.

It should be noted that the Merge mode includes, but is not limited to, the following types of Merge modes: a Regular merge mode (i.e., a regular merge mode); a merge mode for triangle prediction (a TPM mode); a merge mode for encoding motion information difference values (a MMVD mode); a merge mode for using sub-block motion information (a SB Merge mode); and a merge mode for generating a new prediction value by combining the inter-frame prediction value and the intra-frame prediction value (a CIIP mode).

In an example, the Regular merge mode includes a regular merge mode where no residuals are encoded (i.e., skip mode) and a regular merge mode where residuals are encoded. The MMVD mode includes a MMVD mode in which a residual is not encoded.

Embodiment 6 step 301 and step 401 involve judging whether the characteristic information of the current block meets a specific condition. In this embodiment, when the characteristic information meets all of the following conditions, it is determined that the characteristic information of the current block meets the specific condition, and the motion vector refinement mode is enabled. Otherwise, the motion vector refinement mode is not enabled.

The motion information prediction mode corresponding to the current block adopts the Regular merge mode (i.e., a regular merge mode), the CIIP mode (namely a merge mode for generating a new prediction value by combining the inter-frame prediction value and the intra-frame prediction value), or the TPM mode (i.e., a merge mode for triangle prediction); alternatively, the motion information prediction mode corresponding to the current block does not adopt the MMVD mode (i.e., a merge mode for encoding motion information difference values), or the SB Merge mode (i.e., a merge mode for using sub-block motion information).

The motion information attribute corresponding to the current block includes: the motion information of the current block includes motion information in two different directions, and the distances between the current frame and each of two reference frames corresponding to the motion information in the two different directions are the same. The size information of the current block includes: the size of the current block is within a defined range.

Embodiment 7 step 301 and step 401 involve judging whether the characteristic information of the current block meets a specific condition. In this embodiment, when the characteristic information meets all of the following conditions, it is determined that the characteristic information of the current block meets the specific condition, and the motion vector refinement mode is enabled. Otherwise, the motion vector refinement mode is not enabled.

The motion information prediction mode corresponding to the current block adopts the Regular merge mode (i.e., a regular merge mode), the CIIP mode (namely a merge mode for generating a new prediction value by combining the inter-frame prediction value and the intra-frame prediction value), the TPM mode (i.e., a merge mode for triangle prediction), or the MMVD mode (i.e., a merge mode for encoding motion information difference values); alternatively, the motion information prediction mode corresponding to the current block does not adopt the SB Merge mode (i.e., a merge mode for using sub-block motion information).

The motion information attribute corresponding to the current block includes: the motion information of the current block includes motion information in two different directions, and the distances between the current frame and each of two reference frames corresponding to the motion information in the two different directions are the same. The size information of the current block includes: the size of the current block is within a defined range.

Embodiment 8 step 301 and step 401 involve judging whether the characteristic information of the current block meets a specific condition. In this embodiment, when the characteristic information meets all of the following conditions, it is determined that the characteristic information of the current block meets the specific condition, and the motion vector refinement mode is enabled. Otherwise, the motion vector refinement mode is not enabled.

The motion information prediction mode corresponding to the current block adopts the Regular merge mode or the CIIP mode; the motion information prediction mode corresponding to the current block does not adopt the MMVD mode, the SB Merge mode, or the TPM mode; alternatively, the motion information prediction mode corresponding to the current block adopts the Regular merge mode, the CIIP mode, or the TPM mode; the motion information prediction mode corresponding to the current block does not adopt the MMVD mode or the SB Merge mode; alternatively, the motion information prediction mode corresponding to the current block adopts the Regular merge mode, the CIIP mode, or the TPM mode, or the MMVD mode; the motion information prediction mode corresponding to the current block does not adopt the SB Merge mode.

The motion information attribute corresponding to the current block includes: the motion information of the current block includes motion information in two different directions, and it is not limited that the distances between the current frame and each of two reference frames corresponding to the motion information in the two different directions are the same, i.e. this limitation condition is removed. The size information of the current block includes: the size of the current block is within a defined range.

Embodiment 9 regarding "the size of the current block is within a defined range" in the above embodiments 4 to 8, if the size of the current block meets the following condition, it is determined that the size of the current block is within the defined range.

The width value of the current block is within a range of [first threshold, second threshold], wherein the first threshold may be 4, and the second threshold may be 128. The height of the current block is within a range of [third threshold, fourth threshold], wherein the third threshold may be 8, and the fourth threshold may be 128. For example, the first threshold, the second threshold, the third threshold, and the fourth threshold can each be $2^n$, where n is an integer greater than or equal to 1. The area of the current block is within a range of [fifth threshold, sixth threshold], wherein the fifth threshold may be 64, and the sixth threshold may be 128*128=16384. For example, the fifth threshold and the sixth threshold can both be $4^m$, where m is an integer greater than or equal to 1. In the above example, the expression [a, b] can represent a value greater than or equal to a and less than or equal to b.

Embodiment 10 at step 302 and step 402, a first reference block corresponding to the current block is determined from a first reference frame based on a first original motion vector, and the pixel value of each pixel point in the first reference block is referred to as a first pixel value; a second reference block corresponding to the current block is determined from a second reference frame based on the second original motion vector, and the pixel value of each pixel point in the second reference block is referred to as a second pixel value, which is described below.

A first pixel value of each pixel point in the first reference block is obtained by interpolating the pixel values of adjacent pixel points in the first reference block, or is obtained by copying the pixel values of adjacent pixel points in the first reference block; a second pixel value of each pixel point in the second reference block is obtained by interpolating the pixel values of adjacent pixel points in the second reference block, or is obtained by copying the pixel values of adjacent pixel points in the second reference block. The size of the first reference block is the same as the size of the second reference block, the width value of the first/second reference block is determined based on the width value of the current block and the search range, and the height value of the first/second reference block is determined based on the height value of the current block and the search range.

Figure 5:
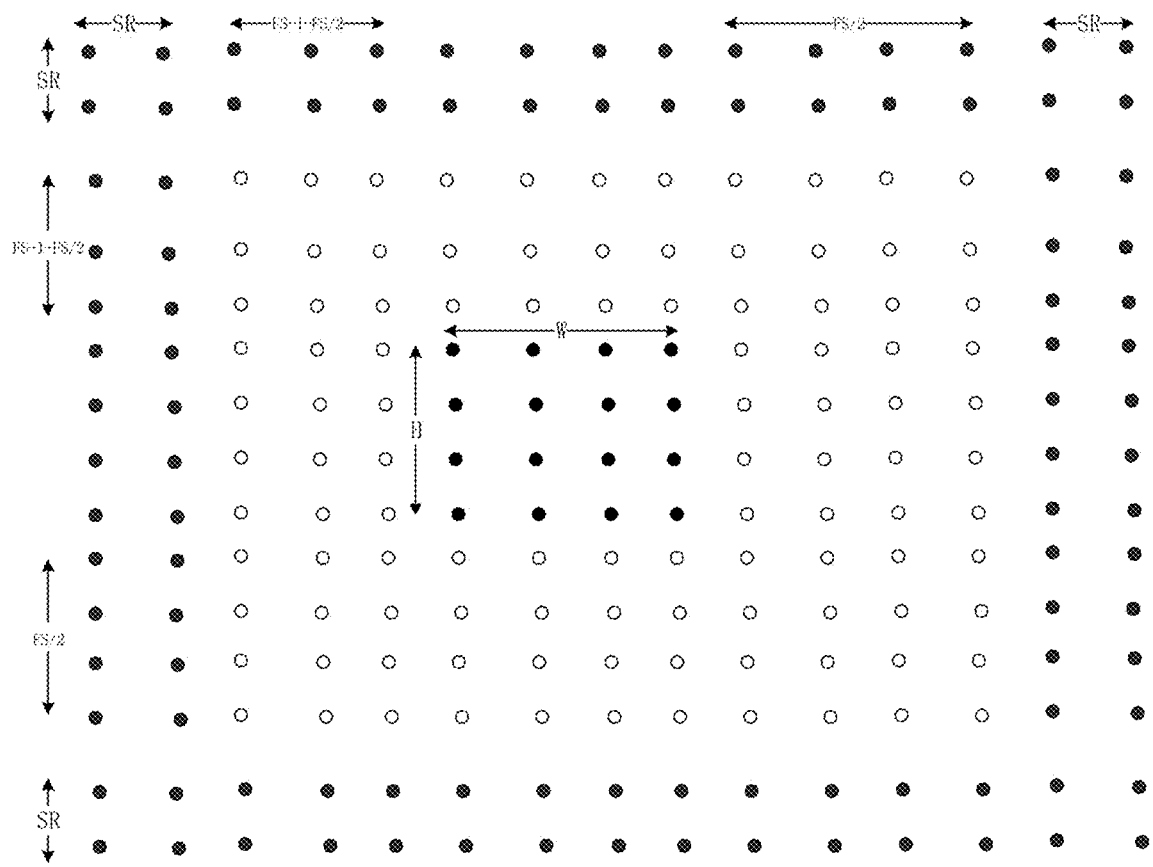
FIG. 5 is a schematic diagram of reference pixels according to an embodiment of the present application.

Referring to FIG. 5, assuming that the current block has a width W and a height H, the first original motion vector is denoted as MV0, and the second original motion vector is denoted as MV1. The integer-pixel block with the area of (W+FS-1)*(H+FS-1) is obtained from the corresponding position of the first original motion vector MV0 in the first reference frame, and the integer-pixel block is marked as an integer-pixel block A. And the integer-pixel block with the area of (W+FS-1)*(H+FS-1) is obtained from the corresponding position of the second original motion vector MV1 in the second reference frame, and the integer-pixel block is marked as an integer-pixel block B.

In one example, based on the integer-pixel block A with the area of (W+FS-1)*(H+FS-1), an initial reference pixel block with a size of (W+2*SR)*(H+2*SR) can be obtained by means of bilinear interpolation, and the initial reference pixel block can be denoted as a first reference block. Based on the integer-pixel block B with the area of (W+FS-1)*(H+FS-1), an initial reference pixel block with a size of (W+2*SR)*(H+2*SR) can be obtained by means of bilinear interpolation, and the initial reference pixel block can be denoted as a second reference block.

In another example, based on the integer-pixel block A with the area of (W+FS-1)*(H+FS-1), an initial reference pixel block with a size of (W+2*SR)*(H+2*SR) can be obtained by means of direct copying (without interpolation), and the initial reference pixel block can be denoted as a first reference block. Based on the integer-pixel block B with the area of (W+FS-1)*(H+FS-1), an initial reference pixel block with a size of (W+2*SR)*(H+2*SR) can be obtained by means of direct copying, and the initial reference pixel block can be denoted as a second reference block.

Exemplarily, for the luminance component only (since the subsequent search process calculates a cost value only by using the luminance component to reduce complexity), initial reference pixel blocks with the size of (W+2*SR)*(H+2*SR) can be obtained based on integer-pixel blocks (e.g., integer-pixel block A and integer-pixel block B) with the area of (W+FS-1)*(H+FS-1), i.e., a first reference block (e.g., Pred_Inter0) and a second reference block (e.g., Pred_Inter1).

In an example, FS can be a number of taps of the interpolation filter, e.g. FS can be 8, etc.

Obtaining the first/second reference block by means of bilinear interpolation is that: the pixel value of each pixel point in the first/second reference block is obtained by interpolating the pixel values of adjacent pixel points in the first/second reference block, which however is not limited hereto. Obtaining the first/second reference block by copying is that: the pixel value of each pixel point in the first/second reference block is obtained by copying the pixel values of adjacent pixel points in the first/second reference block, which however is not limited hereto.

Referring to the above embodiment, the first reference block has an area of (W+2*SR)*(H+2*SR), the second reference block has an area of (W+2*SR)*(H+2*SR), that is, the width value of the first/second reference block is W+2*SR, and the height value of the first/second reference block is H+2*SR. W is the width of the current block, H is the height of the current block, SR is the search range, i.e. the number of iterations of the following embodiments, SR is the maximum horizontal/vertical component interpolation of the target motion vector and the original motion vector, e.g. SR can be 2, etc.

For the first and second reference blocks, they are used for the motion vector adjustment in the subsequent process.

Embodiment 11 in step 303 and step 403, for each sub-block of the current block, the first original motion vector is adjusted according to the first pixel value of the first reference block and the second pixel value of the second reference block to obtain a first target motion vector of the sub-block; and the second original motion vector is adjusted according to the first pixel value of the first reference block and the second pixel value of the second reference block to obtain a second target motion vector of the sub-block.

The adjustment process of the original motion vector is described by the processing procedure of one sub-block (e.g.

each dx*dy sized sub-block of the current block, e.g. a 16*16 sized sub-block, or a smaller block), for example.

At step a1, a first original motion vector or a second original motion vector is determined as a center motion vector.

For example, assuming that the first original motion vector is (4,4) and the second original motion vector is (−4,−4), the first original motion vector (4,4) or the second original motion vector (−4,−4) can be determined as the center motion vector. For convenience of description, taking determining the first original motion vector (4,4) as the center motion vector for example, the procedure of determining the second original motion vector (−4,−4) as the center motion vector is similar.

At step a2, an edge motion vector corresponding to the center motion vector is determined.

For example, the center motion vector (x,y) is shifted towards different directions by S, and an edge motion vector (x,y+S), an edge motion vector (x,y−S), an edge motion vector (x+S,y), an edge motion vector (x−S,y) and an edge motion vector (x+ right,y+ down) in different directions are sequentially obtained, wherein right can be S or −S, and down can be S or −S, the way how right and down are determined refers to the following embodiments.

Figure 6:
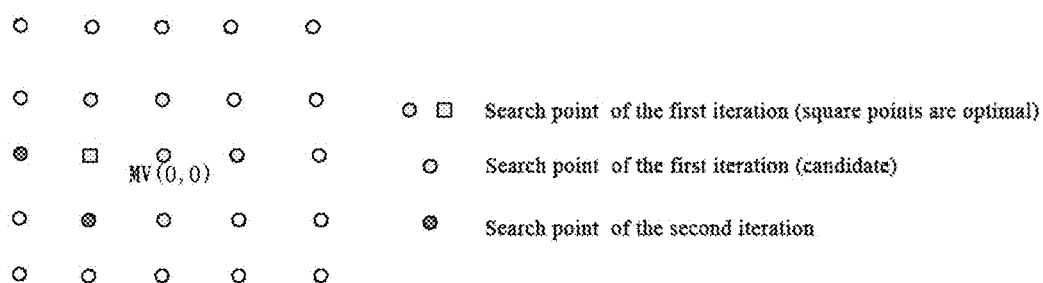
FIG. 6 is a schematic diagram of motion vector iteration according to an embodiment of the present application.

Referring to FIG. 6, the center motion vector (x,y) is taken as the center, that is, the center motion vector is (0,0), and S is 1, right and down are both 1 for example, then the edge motion vectors corresponding to the center motion vector (0,0) include: an edge motion vector (0,1), an edge motion vector (0,−1), an edge motion vector (1,0), an edge motion vector (−1,−0), and an edge motion vector (1,1).

At step a3, a first cost value corresponding to the center motion vector and a second cost value corresponding to each edge motion vector are obtained according to the first pixel value of the first reference block and the second pixel value of the second reference block.

For example, a sub-reference block A1 corresponding to the center motion vector (0,0) is obtained by copying from the first reference block, and the sub-reference block A1 is a sub-reference block of the center motion vector (0,0) in the first reference block. The size of the sub-reference block A1 is the size of the current block, and the sub-reference block A1 is the most center W*H block in the first reference block.

A sub-reference block B1 corresponding to the center motion vector (0,0) is obtained by copying from the second reference block, and the sub-reference block B1 is a sub-reference block of the center motion vector (0,0) in the second reference block. The size of the sub-reference block B1 is the size of the current block, and the sub-reference block B1 is the most center W*H block in the second reference block.

Then, a cost value 1 corresponding to the center motion vector (0,0) is obtained according to the first pixel value of the sub-reference block A1 and the second pixel value of the sub-reference block B1, and the method of determining the cost value refers to the following embodiments.

A sub-reference block A2 corresponding to the edge motion vector (0,1) is obtained by copying from the first reference block, and the sub-reference block A2 is a sub-reference block of the edge motion vector (0,1) in the first reference block. The size of the sub-reference block A2 is the size of the current block, and the sub-reference block A2 is the most center W*H block in the first reference block.

A sub-reference block B2 corresponding to the motion vector (0,−1) symmetrical to the edge motion vector (0,1) is obtained by copying from the second reference block, and the sub-reference block B2 is a sub-reference block of the symmetric motion vector (0,−1) in the second reference block. The size of the sub-reference block B2 is the size of the current block, and is a block W*H in the second reference block.

Then, a cost value 2 corresponding to the edge motion vector (0,1) is obtained according to the first pixel value of the sub-reference block A2 and the second pixel value of the sub-reference block B2, and the method of determining the cost value refers to the following embodiments.

Based on the method of determining the cost value 2 corresponding to the edge motion vector (0,1), a cost value 3 corresponding to the edge motion vector (0,−1), a cost value 4 corresponding to the edge motion vector (1,0), a cost value 5 corresponding to the edge motion vector (−1,−0), and a cost value 6 corresponding to the edge motion vector (1,1) can be determined.

At step a4: a motion vector is selected from the center motion vector and the edge motion vector as an optimal motion vector according to the first cost value and the second cost value. For example, the motion vector having the smallest cost value can be used as the optimal motion vector. For example, assuming that the cost value 2 corresponding to the edge motion vector (0,1) is minimum, the edge motion vector (0,1) corresponding to the cost value 2 can be used as the optimal motion vector.

At step a5: it is judged whether an end condition is met; if the end condition is not met, the optimal motion vector is determined as the center motion vector, and step a2 is returned to and executed; if the end condition is met, step a6 is executed.

In an example, if the number of iteration time/search range reaches a threshold, an end condition is met; if the iteration time/search range does not reach the threshold, the end condition is not met. For example, assuming that SR is 2, i.e., the threshold is 2, two times of iterations are allowed. If the iteration time/search range has reached 2 times, i.e. step a2 to step a4 have been executed twice, the end condition is met; otherwise, the end condition is not met.

In a further example, after selecting a motion vector from the center motion vector and the edge motion vectors as an optimal motion vector, if the center motion vector is selected as the optimal motion vector, the end condition is met.

At step a6, a first integer-pixel motion vector adjustment value (which is used for adjusting the first original motion vector) and a second integer-pixel motion vector adjustment value (which is used for adjusting the second original motion vector) are determined according to the optimal motion vector.

In an example, the first integer-pixel motion vector adjustment value can be determined according to the optimal motion vector and the first original motion vector, and the second integer-pixel motion vector adjustment value can be determined according to the first integer-pixel motion vector adjustment value, wherein the second integer-pixel motion vector adjustment value is symmetric to the first integer-pixel motion vector adjustment value.

For example, in the first iterative process, the optimal motion vector is the edge motion vector (0,1), the second iteration is performed with the edge motion vector (0,1) as the center, and in the second iterative process, the optimal motion vector is the edge motion vector (0,1); assuming that the iterative process is completed hereto, the first integer-pixel motion vector adjustment value is (0,2), that is, the sum of the edge motion vector (0,1) and the edge motion vector (0,1).

Based on the above, assuming that the first original motion vector is (4,4), the optimal motion vector is the edge motion vector (0,1) in the first iterative process, i.e. the optimal motion vector can correspond to the optimal motion vector (4, 5). The second iterative process is performed by taking the edge motion vector (0,1) as a center, wherein the optimal motion vector is the edge motion vector (0,1) in the second iterative process, namely the optimal motion vector can correspond to the optimal motion vector (4,6).

In conclusion, a first integer-pixel motion vector adjustment value is determined according to the optimal motion vector (4,6) and the first original motion vector (4,4), the first integer-pixel motion vector adjustment value is the difference between the optimal motion vector (4,6) and the first original motion vector (4,4), i.e. the first integer-pixel motion vector adjustment value is (0,2).

Then a second integer-pixel motion vector adjustment value is determined according to the first integer-pixel motion vector adjustment value (0,2), which can be (0,−2), i.e. a symmetric value of (0,2).

At step a7, a first sub-pixel motion vector adjustment value (which is used for adjusting the first original motion vector) and a second sub-pixel motion vector adjustment value (which is used for adjusting the second original motion vector) are determined according to the optimal motion vector.

In an example, a first sub-pixel motion vector adjustment value can be determined according to a cost value corresponding to the optimal motion vector and a cost value corresponding to the edge motion vector corresponding to the optimal motion vector, and then a second sub-pixel motion vector adjustment value can be determined according to the first sub-pixel motion vector adjustment value.

For example, $x_0=N*(E(-1,0)-E(1,0))/(E(-1,0)+E(1,0)-2*E(0,0))$, $y_0=N*(E(0,-1)-E(0,1))/(E(0,-1)+E(0,1)-2*E(0,0))$, and when the motion vector pixel precision is ½, ¼, ⅛, and 1/16, N=1, 2, 4, and 8 respectively. Then, $(x_0, y_0)$ is assigned to deltaMv, SPMV=deltaMv/2N, and if the current motion vector pixel precision is 1/16, the SPMV is $(x_0/16, y_0/16)$.

In the above equation, SPMV is the first sub-pixel motion vector adjustment value, and N is related to motion vector pixel precision, e.g., if the motion vector pixel precision is ½, N is 1; if the motion vector pixel precision is ¼, N is 2; if the motion vector pixel precision is ⅛, N is 4; if the motion vector pixel precision is 1/16, N is 8.

In the above equation, E(0,0) represents a cost value of the optimal motion vector; E(−1,0) is a cost value of the edge motion vector (−1,0) of an optimal motion vector (0,0) with the optimal motion vector taken as the center; E(1,0) is a cost value of the edge motion vector (1,0) of the optimal motion vector (0,0) with the optimal motion vector taken as the center; E(0,−1) is a cost value of an edge motion vector (0,−1) of the optimal motion vector (0,0) with the optimal motion vector taken as the center; E(0,1) is a cost value of the edge motion vector (0,1) of the optimal motion vector (0,0) with the optimal motion vector taken as the center. For the cost value of each motion vector, the method of determining the cost value of each motion vector can refer to the above embodiments, which is not described herein in detail.

After determining the first sub-pixel motion vector adjustment value in the above method, the second sub-pixel motion vector adjustment value can be determined according to the first sub-pixel motion vector adjustment value, where the second sub-pixel motion vector adjustment value is a symmetric value of the first sub-pixel motion vector adjustment value. For example, if the first sub-pixel motion vector adjustment value is (1,0), the second sub-pixel motion vector adjustment value is (−1,−0), i.e., a symmetric value of (1,0).

At step a8, the first original motion vector is adjusted according to the first integer-pixel motion vector adjustment value and/or the first sub-pixel motion vector adjustment value to obtain a first target motion vector.

For example, the first target motion vector=the first original motion vector+the first integer-pixel motion vector adjustment value+the first sub-pixel motion vector adjustment value. Of course, the above is merely an example and is not limited thereto.

At step a9, the second original motion vector is adjusted according to the second integer-pixel motion vector adjustment value and/or the second sub-pixel motion vector adjustment value to obtain a second target motion vector.

For example, the second target motion vector=the second original motion vector+the second integer-pixel motion vector adjustment value+the second sub-pixel motion vector adjustment value. Of course, the above is merely an example and is not limited thereto.

Embodiment 12 at step 303 and step 403, for each sub-block of the current block, the first original motion vector is adjusted according to the first pixel value of the first reference block and the second pixel value of the second reference block to obtain a first target motion vector of the sub-block; and the second original motion vector is adjusted according to the first pixel value of the first reference block and the second pixel value of the second reference block to obtain a second target motion vector of the sub-block.

The adjustment process of the original motion vector is described by the processing procedure of one sub-block (e.g. each dx*dy sized sub-block of the current block, e.g. a 16*16 sized sub-block, or a smaller block), for example. The first original motion vector is denoted as Org_MV0, the second original motion vector is denoted as Org_MV1, the first target motion vector obtained after the adjustment of the first original motion vector Org_MV0 is denoted as Refined_MV0, and the second target motion vector obtained after the adjustment of the second original motion vector Org_MV1 is denoted as Refined_MV1.

At step b1, SR times of iterations are performed to obtain the optimal integer-pixel offset of the integer-pixel MV point, which is denoted as IntegerDeltaMV, which is the first integer-pixel motion vector adjustment value in the above embodiments. For example, IntegerDeltaMV is initialized to (0,0), and the subsequent processing for each iteration is performed as:

At step b1, deltaMV is set to (0,0). If the first iteration is performed, a prediction value block A1 (i.e., the W*H block in the center of the first reference block) is copied based on the reference pixel of the first original motion vector in the first reference block; a prediction value block B1 (i.e. the W*H block in the center of the second reference block) is copied based on the reference pixel of the second original motion vector in the second reference block. An initial cost value cost (initial cost value is SAD (sum of absolute differences) based on the prediction value block A1 and the prediction value block B1) is obtained based on the prediction value block A1 and the prediction value block B1, and the method of determining the initial cost value is described in the following embodiments. If the initial cost value cost is less than 4*dx*dy/2, and dx and dy are the width and height of the current sub-block, the subsequent search process is directly skipped, step b2 is executed, and notZeroCost is set as false.

Step b12, as shown in FIG. 6, five offset MVs (which are all referred to as MVOffset) are sequentially obtained according to {Mv(0,1), Mv(0,−1), Mv(1,0), Mv(−1,0), Mv(right,down)}, with the above initial point taken as the center, and the calculation and comparison process of the cost values of these five offset MVs is performed.

For example, based on a certain MVOffset (e.g., Mv(0,1), etc.), in the first and second reference blocks, two prediction value blocks (e.g., a W*H block with center position offset MVOffset in the first reference block, and a W*H block with center position offset −MVOffset (opposite to MVOffset) in the second reference block) are obtained from this MVOffset, and the down-sampling SAD of the two prediction value blocks are calculated as the cost value of MVOffset.

Then, the MVOffset with the minimum cost value is reserved, this MVOffset is updated to the value of deltaMV, and is used as a new center offset point of the next iteration.

The value of IntegerDeltaMV is updated based on the deltaMV, wherein the updated IntegerDeltaMV=IntegerDeltaMV before updating+deltaMV, i.e., adding deltaMV on the basis of the current IntegerDeltaMV.

At step b13, after iteration, if the optimal MV is still the initial MV (i.e. not MVOffset) or the minimum cost value is 0, the next iterative search process is not performed, step b2 is executed, and notZeroCost is set as false. Otherwise, if the iteration times reach SR, step b2 is executed, and if the iteration times do not reach SR, the optimal MV is taken as the center, and the next iterative search process is performed, that is, step b11 is returned to.

After the iterative search process is finished, the value of IntegerDeltaMV is obtained, namely the final value of IntegerDeltaMV, namely the first integer-pixel motion vector adjustment value, which is subsequently denoted as IntegerDeltaMV.

At step b2, the optimal integer-pixel MV point in step b1 is taken as the center, then the optimal sub-pixel offset MV is obtained, which is denoted as SPMV, and the SPMV is the first sub-pixel motion vector adjustment value in the above embodiments. For example, the SPMV can be initialized to (0,0) and then the subsequent processing is performed as follows.

At step b21, subsequent processing (namely obtaining the SPMV) is only performed when notZeroCost is not false and deltaMV is (0,0), otherwise, the original motion vector is directly adjusted by using IntegerDeltaMV instead of using IntegerDeltaMV and SPMV.

At step b22, E(x,y) is represented as the cost value corresponding to the MV of the optimal MV point offset (x,y) obtained in step b1 (the cost value calculated in step b1). Based on the E(x,y) of the center, top, bottom, left and right five points, the offset $(x_0, y_0)$ of the point with the smallest E(x,y) can be obtained as follows: $x_0 = N*(E(-1,0)-E(1,0))/(E(-1,0)+E(1,0)-2*E(0,0))$, $y_0 = N*(E(0,-1)-E(0,1))/(E(0,-1)+E(0,1)-2*E(0,0))$.

In an example, when the motion vector pixel precision is ½, ¼, ⅛, and 1/16, N=1, 2, 4, and 8 respectively. Then, $(x_0, y_0)$ is assigned to deltaMv, SPMV=deltaMv/2N, and if the current motion vector pixel precision is 1/16, the SPMV is $(x_0/16, y_0/16)$.

If E(−1,−0)=E(0,0), a shift is performed by half a pixel horizontally to the left (deltaMv[0]=−N).

If E(1,0)=E(0,0), a shift is performed by half a pixel horizontally to the right (deltaMv[0]=N).

If E(0,−1)=E(0,0), a shift is performed by half a pixel vertically upward (deltaMv [1]=−N).

If E(0,1)=E(0,0), a shift is performed by half a pixel vertically downward (deltaMv [1]=N).

Based on the above processing, the value of the SPMV, i.e., the first sub-pixel motion vector adjustment value, can be obtained.

At step b3, the optimal offset MV is obtained based on the integer-pixel offset IntegrarteltaMV in step b1 and the sub-pixel offset SPMV in step b2, and the optimal offset MV is denoted as BestMVoffset. Also, BestMVoffset=IntegerDeltaMV+SPMV.

Based on BestMVoffset, the target motion vectors in two directions can be obtained: Refined_MV0=Org_MV0+BestMVoffset; Refined_MV1=Org_MV1−BestMVoffset.

Notably, BestMVoffset=IntegerDeltaMV+SPMV, i.e. the sum of the first integer-pixel motion vector adjustment value and the first sub-pixel motion vector adjustment value. Furthermore, −IntegerDeltaMV is the symmetric value of IntegerDeltaMV, i.e. the second integer-pixel motion vector adjustment value, −SPMV is the symmetric value of SPMV, i.e. the second sub-pixel motion vector adjustment value, so that −BestMVoffset=(−IntegerDeltaMV)+(−SPMV), i.e. the sum of the second integer-pixel motion vector adjustment value and the second sub-pixel motion vector adjustment value.

Embodiment 13 with respect to step 303 and step 403, the implementation of adjusting the first and second original motion vectors Org_MV0 and Org_MV1 to the first and second target motion vectors Refined_MV0 and Refined_MV1 respectively is similar to that of embodiment 12, except that:

"if the initial cost value cost is less than 4*dx*dy/2, . . . , the subsequent search process is directly skipped" in step b11 is removed, that is, even if the initial cost value cost is less than 4*dx*dy/2, it will not "skip the subsequent search process directly", but continue the subsequent search process, that is, step b12 needs to be executed.

Embodiment 14 with respect to step 303 and step 403, the implementation of adjusting the first and second original motion vectors Org_MV0 and Org_MV1 to the first and second target motion vectors Refined_MV0 and Refined_MV1 respectively is similar to that of embodiment 12, except that:

"if the initial cost value cost is less than 4*dx*dy/2, then directly skip the subsequent search process" in step b11 is removed, that is, even if the initial cost value cost is less than 4*dx*dy/2, it will not "skip the subsequent search process directly", but continue the subsequent search process, that is, step b12 needs to be executed.

"if the optimal MV is still the initial MV (i.e. not MVOffset) or the minimum cost value is 0, the next iterative search process is not performed" in step b13 is removed, that is, even if the optimal MV is still the initial MV or the minimum cost value is 0, the next iterative search process can be performed.

Embodiment 15 with respect to step 303 and step 403, the implementation of adjusting the first and second original motion vectors Org_MV0 and Org_MV1 to the first and second target motion vectors Refined_MV0 and Refined_MV1 respectively is similar to that of embodiment 12, except that:

the correlation process of "notZeroCost" is removed, that is, the value of notZeroCost is not set and saved in step b11 and step b13. In step b21, the sub-pixel offset calculation process (i.e., step b22) can be performed when the deltaMV is (0,0), instead of only when notZeroCost is not false and deltaMV is (0,0).

Embodiment 16 with respect to step 303 and step 403, the implementation of adjusting the first and second original motion vectors Org_MV0 and Org_MV1 to the first and second target motion vectors Refined_MV0 and Refined_MV1 respectively is similar to that of embodiment 12, except that:

"subsequent processing is only performed when notZeroCost is not false and deltaMV is (0,0), otherwise, the original motion vector is directly adjusted by using IntegerDeltaMV" in step b21 is modified to "subsequent processing is only performed when notZeroCost is not false and the cost values of four points which are respectively at the top, bottom, left and right of and have a distance of one pixel from the current optimal integer-pixel are obtained by calculation in the step b1, otherwise, the original motion vector is directly adjusted by using IntegerDeltaMV".

In an example, "subsequent processing" refers to the sub-pixel offset calculation process in step b22.

In an example, the sub-pixel offset calculation process in step b22 needs to use cost values of four points which are respectively at the top, bottom, left and right of and have a distance of one pixel from the current optimal integer-pixel, so it is a necessary condition that "cost values of four points which are respectively at the top, bottom, left and right of and have a distance of one pixel from the current optimal integer-pixel" have been calculated in step b1.

Embodiment 17 with respect to step 303 and step 403, the implementation of adjusting the first and second original motion vectors Org_MV0 and Org_MV1 to the first and second target motion vectors Refined_MV0 and Refined_MV1 respectively is similar to that of embodiment 12, except that:

"subsequent processing is only performed when notZeroCost is not false and deltaMV is (0,0), otherwise, the original motion vector is directly adjusted by using IntegerDeltaMV" in step b21 is modified to "subsequent processing (i.e., the sub-pixel offset calculation process) is only performed when cost values of four points which are respectively at the top, bottom, left and right of and have a distance of one pixel from the current optimal integer-pixel are obtained by step b1, otherwise, the original motion vector is directly adjusted by using IntegerDeltaMV".

Embodiment 18 with respect to step 303 and step 403, the implementation of adjusting the first and second original motion vectors Org_MV0 and Org_MV1 to the first and second target motion vectors Refined_MV0 and Refined_MV1 respectively is similar to that of embodiment 12, except that:

"subsequent processing is only performed when notZeroCost is not false and deltaMV is (0,0), otherwise, the original motion vector is directly adjusted by using IntegerDeltaMV" in step b21 is modified to "subsequent processing (i.e., the sub-pixel offset calculation process in the step b22) is performed when cost values of four points which are respectively at the top, bottom, left and right of and have a distance of one pixel from the current optimal integer-pixel are obtained by step b1, otherwise, step b23 is executed.

At step b23, the current optimal integer-pixel point MV_inter_org is set to the nearest integer-pixel point MV_inter_nearest, the cost values of four points which are respectively at the top, bottom, left and right of and have a distance of one pixel from the nearest integer-pixel point have been obtained in step b1. Then, the sub-pixel offset calculation process of step b22 is performed centering on the MV_inter_nearest, that is, obtaining the SPMV centering on the MV_inter_nearest.

For example, if the cost values of four points which are respectively at the top, bottom, left and right of and have a distance of one pixel from the current optimal integer-pixel point are not all obtained by step b1, one integer-pixel point MV_inter_nearest is selected from the periphery of the optimal integer-pixel point MV_inter_org, and the cost values of four points which are respectively at the top, bottom, left and right of the integer-pixel point MV_inter_nearest are obtained by step b1.

Then, the integer-pixel point MV_inter_nearest is set as the current optimal integer-pixel point, and the SPMV is obtained centering on the integer-pixel point MV_inter_nearest, and the specific process refers to step b22.

When obtaining the SPMV centering on the integer-pixel point MV_inter_nearest, referring to step b22, $x_0$ and $y_0$ can be limited to the range of $[-2N, 2N]$ when calculating $x_0$ and $y_0$. If $x_0/y_0$ is greater than $2N$, $x_0/y_0$ can be assigned with $2N$; if $x_0/y_0$ is less than $-2N$, $x_0/y_0$ can be assigned with $-2N$. When the motion vector pixel precision is ½, ¼, ⅛, and 1/16, $N=1, 2, 4$, and 8 respectively.

Embodiment 19 in the above embodiments, it is necessary to determine edge motion vectors corresponding to the center motion vector, such as 5 edge motion vectors. For example, the center motion vector (x,y) can be shifted by S in different directions, and edge motion vector (x,y+S), edge motion vector (x,y−S), edge motion vector (x+S,y), edge motion vector (x−S,y), and edge motion vector (x+right,y+down) in different directions can be obtained sequentially. Alternatively, the center motion vector (x,y) can be shifted by S in different directions, and edge motion vector (x,y−S), edge motion vector (x,y+S), edge motion vector (x−S,y), edge motion vector (x+S,y), and edge motion vector (x+ right, y+ down) in different directions can be obtained sequentially.

For example, assuming that (x,y) is (0,0) and S is 1, then 5 edge motion vectors can be obtained sequentially according to (0,1), (0,−1), (1,0), (−1,−0), and (right,down). Alternatively, 5 edge motion vectors can be obtained sequentially according to (0,−1), (0,1), (−1,−0), (1,0), and (right,down).

Embodiment 20 in the above embodiments, the default value of the edge motion vector (x+right,y+down) is (x−S,y−S). If the cost value of the edge motion vector (x+S,y) is smaller than that of the edge motion vector (x−S,y), right is S (−S is modified to S); if the cost value of the edge motion vector (x,y+S) is smaller than that of the edge motion vector (x, y−S), down is S (−S is modified to S). Alternatively, if the cost value of the edge motion vector (x+S,y) is less than or equal to the cost value of the edge motion vector (x−S,y), right is S (−S is modified to S); if the cost value of the edge motion vector (x,y+S) is less than or equal to the cost value of the edge motion vector (x,y−S), down is S (−S is modified to S).

For example, 5 edge motion vectors are obtained sequentially according to (0,1), (0, −1), (1,0), (−1,−0), (right,down), and the default value of (right,down) is (−1,−1). If the cost value of the edge motion vector (1,0) is less than the cost value of the edge motion vector (−1, 0), right is 1; if the cost value of the edge motion vector (0,1) is smaller than the cost value of the edge motion vector (0,−1), down is 1. Alternatively, if the cost value of the edge motion vector (1,0) is less than or equal to the cost value of the edge motion vector (−1,−0), right is 1; if the cost value of the edge motion vector (0,1) is less than or equal to the cost value of the edge motion vector (0,−1), down is 1.

For example, 5 edge motion vectors are obtained sequentially according to (0,−1), (0,1), (−1,−0), (1,0), (right,down), and the default value of (right,down) is (−1,−1). If the cost value of the edge motion vector (1,0) is less than the cost value of the edge motion vector (−1, 0), right is 1; if the cost value of the edge motion vector (0,1) is smaller than the cost value of the edge motion vector (0,−1), down is 1. Alternatively, if the cost value of the edge motion vector (1,0) is less than or equal to the cost value of the edge motion vector (−1,−0), right is 1; if the cost value of the edge motion vector (0,1) is less than or equal to the cost value of the edge motion vector (0,−1), down is 1.

Embodiment 21 in steps 303 and 403, for each sub-block of the current block, the first original motion vector is adjusted according to the first pixel value of the first reference block and the second pixel value of the second reference block to obtain a first target motion vector of the sub-block; and the second original motion vector is adjusted according to the first pixel value of the first reference block and the second pixel value of the second reference block to obtain a second target motion vector of the sub-block.

The adjustment process of the original motion vector is described by the processing procedure of one sub-block (e.g. each dx*dy sized sub-block of the current block, e.g. a 16*16 sized sub-block, or a smaller block), for example.

At step c1, the first original motion vector or the second original motion vector is taken as a center, some or all of the motion vectors are selected from surrounding motion vectors, and the selected motion vectors are determined as candidate motion vectors.

For example, some or all of the motion vectors can be selected from the surrounding motion vectors as candidate motion vectors, with the first original motion vector taken as the center. Refer to the following embodiments for details.

In the following embodiments, the first original motion vector is taken as the center motion vector for description.

At step c2, a third cost value corresponding to the first original motion vector and a fourth cost value corresponding to each candidate motion vector are acquired according to the first pixel value of the first reference block and the second pixel value of the second reference block.

For example, a sub-reference block A1 corresponding to the first original motion vector is obtained by copying from the first reference block, the sub-reference block A1 is a sub-reference block of the first original motion vector in the first reference block, and the size of the sub-reference block A1 is the size of the current block. A sub-reference block B1 corresponding to the second original motion vector is obtained by copying from the second reference block, the sub-reference block B1 is a sub-reference block of the second original motion vector in the second reference block, and the size of the sub-reference block B1 is the size of the current block. Then, a third cost value corresponding to the first original motion vector is obtained according to the first pixel value of the sub-reference block A1 and the second pixel value of the sub-reference block B1.

For each candidate motion vector, a sub-reference block A2 corresponding to the candidate motion vector is obtained by copying from the first reference block, the sub-reference block A2 is a sub-reference block of the candidate motion vector in the first reference block, and the size of the sub-reference block A2 is the size of the current block. A sub-reference block B2 corresponding to the motion vector symmetrical to the candidate motion vector is obtained by copying from the second reference block, and the size of the sub-reference block B2 is the size of the current block. And acquiring a fourth cost value corresponding to the candidate motion vector according to the first pixel value of the sub-reference block sA2 and the second pixel value of the sub-reference block B2.

At step c3: a motion vector is selected from the first original motion vector and the candidate motion vectors as an optimal motion vector according to the third cost value and the fourth cost value. For example, the motion vector with the smallest cost value (e.g., the first original motion vector, or any one of the candidate motion vectors) is used as the optimal motion vector.

At step c4, a first integer-pixel motion vector adjustment value (which is used for adjusting the first original motion vector) and a second integer-pixel motion vector adjustment value (which is used for adjusting the second original motion vector) are determined according to the optimal motion vector. In an example, the first integer-pixel motion vector adjustment value can be determined according to the optimal motion vector and the first original motion vector, and the second integer-pixel motion vector adjustment value can be determined according to the first integer-pixel motion vector adjustment value, wherein the second integer-pixel motion vector adjustment value is symmetric to the first integer-pixel motion vector adjustment value.

For example, assuming that the optimal motion vector is (4,6) and the first original motion vector is (4,4), the first integer-pixel motion vector adjustment value is determined from the optimal motion vector (4,6) and the first original motion vector (4,4), the first integer-pixel motion vector adjustment value is the difference between the optimal motion vector (4,6) and the first original motion vector (4,4), i.e. the first integer-pixel motion vector adjustment value is (0,2).

Then a second integer-pixel motion vector adjustment value is determined according to the first integer-pixel motion vector adjustment value (0,2), the second integer-pixel motion vector adjustment value can be (0,−2), i.e. a symmetric value of (0,2).

At step c5, a first sub-pixel motion vector adjustment value (which is used for adjusting the first original motion vector) and a second sub-pixel motion vector adjustment value (which is used for adjusting the second original motion vector) are determined according to the optimal motion vector.

In an example, a first sub-pixel motion vector adjustment value can be determined according to a cost value corresponding to the optimal motion vector and a cost value corresponding to the edge motion vector corresponding to the optimal motion vector, and then a second sub-pixel motion vector adjustment value can be determined according to the first sub-pixel motion vector adjustment value.

For example, $x_0=N*(E(-1,0)-E(1,0))/(E(-1,0)+E(1,0)-2*E(0,0))$, $y_0=N*(E(0,-1)-E(0,1))/(E(0,-1)+E(0,1)-2*E(0,0))$, and when the motion vector pixel precision is ½, ¼, ⅛, and 1/16, N=1, 2, 4, and 8 respectively. Then, $(x_0,y_0)$ is assigned to deltaMv, SPMV=deltaMv/2N, and if the current motion vector pixel precision is 1/16, the SPMV is $(x_0/16, y_0/16)$.

SPMV is the first sub-pixel motion vector adjustment value. E(0,0) represents a cost value of the optimal motion vector; E(−1,0) represents a cost value of the edge motion vector (−1,0) of an optimal motion vector (0,0) with the optimal motion vector taken as the center; E(1,0) represents a cost value of the edge motion vector (1,0) of the optimal motion vector (0,0) with the optimal motion vector taken as the center; E(0,−1) represents a cost value of an edge motion vector (0,−1) of the optimal motion vector (0,0) with the optimal motion vector taken as the center; E(0,1) represents a cost value of the edge motion vector (0,1) of the optimal motion vector (0,0) with the optimal motion vector taken as the center. For the cost value of each motion vector, the method of determining the cost value of each motion vector can refer to the above embodiments.

After determining the first sub-pixel motion vector adjustment value in the above method, the second sub-pixel motion vector adjustment value can be determined according to the first sub-pixel motion vector adjustment value, where the second sub-pixel motion vector adjustment value is a symmetric value of the first sub-pixel motion vector adjustment value. For example, if the first sub-pixel motion vector adjustment value is (1,0), the second sub-pixel motion vector adjustment value is (−1,−0), i.e., a symmetric value of (1,0).

At step c6, the first original motion vector is adjusted according to the first integer-pixel motion vector adjustment value and/or the first sub-pixel motion vector adjustment value to obtain a first target motion vector.

For example, the first target motion vector=first original motion vector+first integer-pixel motion vector adjustment value+first sub-pixel motion vector adjustment value. Of course, the above is merely an example and is not limited thereto.

At step c7, the second original motion vector is adjusted according to the second integer-pixel motion vector adjustment value and/or the second sub-pixel motion vector adjustment value to obtain a second target motion vector.

For example, the second target motion vector=the second original motion vector+the second integer-pixel motion vector adjustment value+the second sub-pixel motion vector adjustment value. Of course, the above is merely an example and is not limited thereto.

Embodiment 22 in step 303 and step 403, for each sub-block of the current block, the first original motion vector is adjusted according to the first pixel value of the first reference block and the second pixel value of the second reference block to obtain a first target motion vector of the sub-block; and the second original motion vector is adjusted according to the first pixel value of the first reference block and the second pixel value of the second reference block to obtain a second target motion vector of the sub-block.

The adjustment process of the original motion vector is described by the processing procedure of one sub-block (e.g. each dx*dy sized sub-block of the current block, e.g. a 16*16 sized sub-block, or a smaller block), for example. The first original motion vector is denoted as Org_MV0, the second original motion vector is denoted as Org_MV1, the first target motion vector is denoted as Refined_MV0, and the second target motion vector is denoted as Refined_MV1.

At step d1, some or all of the motion vectors are selected from (2*SR+1)*(2*SR+1) points around the first original motion vector with the first original motion vector taken as the center. For example, if SR=2, some or all of the motion vectors are selected from 25 points around the first original motion vector as candidate motion vectors. Then, a cost value of the first original motion vector is determined, and a cost value of each candidate motion vector is determined. Then, the motion vector with the minimum cost value is used as the optimal motion vector.

Compared with step b1 of the above embodiment, in step d1, all candidate motion vectors to be processed can be selected at one time without performing an iterative process, instead of selecting some motion vectors in the first iteration and selecting the other motion vectors in the second iteration through an iterative process. Based on this, all of the candidate motion vectors to be processed are selected at one time, so that the candidate motion vectors can be processed in parallel to obtain the cost value of each candidate motion vector, thereby reducing the computational complexity and improving the encoding performance.

At step d2, the value of IntegerDeltaMV is determined according to the optimal motion vector, wherein the final value of IntegerDeltaMV is the first integer-pixel motion vector adjustment value, and the determination method is not repeated here.

At step d3: the optimal motion vector is taken as the center, the optimal sub-pixel offset MV is obtained, which is denoted as SPMV, and the SPMV is the first sub-pixel motion vector adjustment value.

The implementation process of step d3 can be referred to the above step b2, and will not be described repeatedly herein.

At step d4, BestMVoffset is obtained based on IntegerDeltaMV and SPMV. For example, BestMVoffset=IntegerDeltaMV+SPMV.

The target motion vector is obtained based on BestMVoffset: Refined_MV0=Org_MV0+BestMVoffset; Refined_MV1=Org_MV1−BestMVoffset.

Embodiment 23 with respect to step 303 and step 403, the implementation of adjusting the first and second original motion vectors Org_MV0 and Org_MV1 to the first and second target motion vectors Refined_MV0 and Refined_MV1 respectively is similar to that of embodiments 21, 22.

In this embodiment, all of the motion vectors are selected from (2*SR+1)*(2*SR+1) points around the original motion vector with the original motion vector taken as the center. For example, if SR=2, all of the motion vectors are selected from 25 points around the original motion vector, the cost values of these motion vectors are determined, and the cost value of each motion vector is determined. Then, the motion vector with the minimum cost value is used as the optimal motion vector.

Embodiment 24 with respect to step 303 and step 403, the implementation of adjusting the first and second original motion vectors Org_MV0 and Org_MV1 to the first and second target motion vectors Refined_MV0 and Refined_MV1 respectively is similar to that of embodiments 21, 22. In this embodiment, all of the candidate motion vectors to be processed are selected at one time, so that the candidate motion vectors can be processed in parallel to obtain the cost value of each candidate motion vector, thereby reducing the computational complexity and improving the encoding performance.

In this embodiment, some of motion vectors having an offset not exceeding SR is selected from (2*SR+1)*(2*SR+1) points around the original motion vector with the original motion vector taken as the center. For example, N (N is equal to or greater than 1, and equal to or less than (2*SR+1)*(2*SR+1)) candidate points are selected from (2*SR+1)*(2*SR+1) points including the original motion vector. And the cost values of the motion vectors corresponding to the N points are determined. The cost values of the N points are scanned in a certain sequence, and the motion vector with the minimum cost value is selected as the optimal motion vector. If the cost values are equal, the candidate points with the highest sequence are preferentially selected.

Figure 7A:
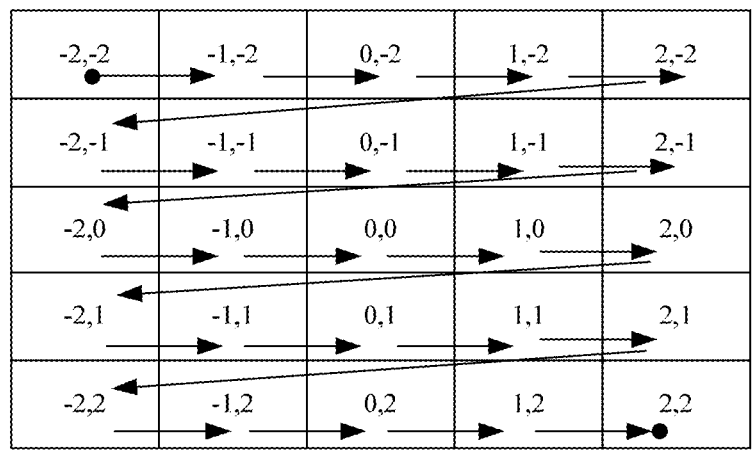
FIGS. 7A-7E are schematic diagrams of the sequence of candidate points according to an embodiment of the present application.

In an example, assuming SR=2, the number of candidate points can be 25, and the sequence of the candidate points can be from left to right and from top to bottom. Referring to FIG. 7A, the sequence of the candidate points can be: {Mv(−2,−2), Mv(−1,−2), Mv(0,−2), Mv(1,−2), Mv(2,−2), Mv(−2,−1), Mv(−1,−1), Mv(0,−1), Mv(1,−1), Mv(2,−1), Mv(−2,−0), Mv(−1,−0), Mv(0,0), Mv(1,0), Mv(2,0), Mv(−2,1), Mv(−1,1), Mv(0,1), Mv(1,1), Mv(2,1), Mv(−2,2), Mv(−1,2), Mv(0,2), Mv(1,2), Mv(2,2)}.

The cost values corresponding to the motion vectors of the 25 points are determined, scanning is performed according to the above sequence, the motion vector with the minimum cost value is obtained as the optimal offset MV, the integer-pixel motion vector adjustment value and the sub-pixel motion vector adjustment value can be determined by using the optimal offset MV, and the determination method refers to the above embodiments.

Figure 7B:
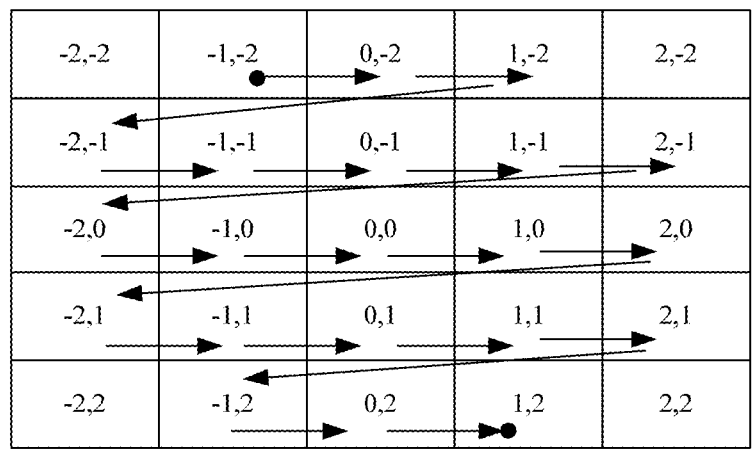

In another example, assuming SR=2, the number of candidate points can be 21, and the sequence of the candidate points can be from left to right and from top to bottom. Referring to FIG. 7B, the sequence of the candidate points can be: {Mv(−1,−2), Mv(0,−2), Mv(1,−2), Mv(−2,−1), Mv(−1,−1), Mv(0,−1), Mv(1,−1), Mv(2,−1), Mv(−2,−0), Mv(−1,−0), Mv(0, 0), Mv(1,0), Mv(2,0), Mv(−2,1), Mv(−1,1), Mv(0,1), Mv(1,1), Mv(2,1), Mv(−1,2), Mv(0,2), Mv(1, 2)}. The cost values corresponding to the motion vectors of the 21 points are determined, scanning is performed according to the above sequence, the motion vector with the minimum cost value is obtained as the optimal offset MV, the integer-pixel motion vector adjustment value and the sub-pixel motion vector adjustment value can be determined by using the optimal offset MV, and the determination method refers to the above embodiments.

Figure 7C:
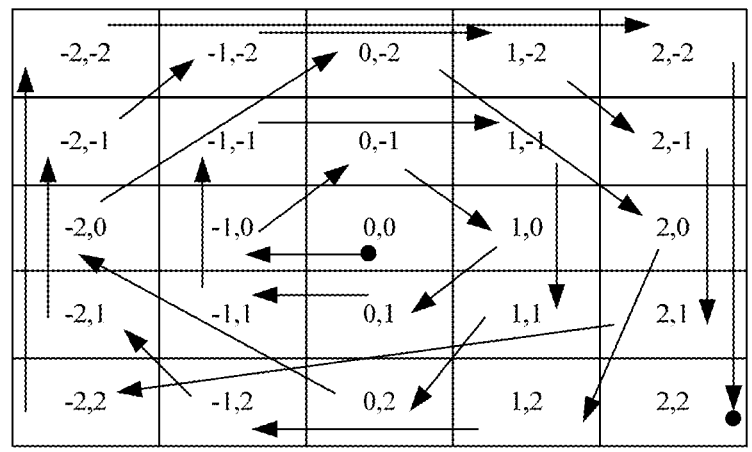

In another example, assuming SR=2, the number of candidate points can be 25, and the sequence of these candidate points is the sequence from near to far away from the center, with the motion vector (0,0) taken as the center. Referring to FIG. 7C, the sequence of the candidate points can be: {Mv(0,0), Mv(−1,−0), Mv(0,−1), Mv(1,0), Mv(0,1), Mv(−1,1), Mv(−1,−1), Mv(1,−1), Mv(1,1), Mv(0,2), Mv(−2,−0), Mv(0,−2), Mv(2,0), Mv(1,2), Mv(−1,2), Mv(−2,1), Mv(−2,−1), Mv(−1,−2), Mv(1,−2), Mv(2,−1), Mv(2,1), Mv(−2,2), Mv(−2,−2), Mv(2,−2), Mv(2,2)}. The cost values corresponding to the motion vectors of the 25 points are determined, scanning is performed according to the above sequence, the motion vector with the minimum cost value is obtained as the optimal offset MV, the integer-pixel motion vector adjustment value and the sub-pixel motion vector adjustment value can be determined by using the optimal offset MV, and the determination method refers to the above embodiments.

Figure 7D:
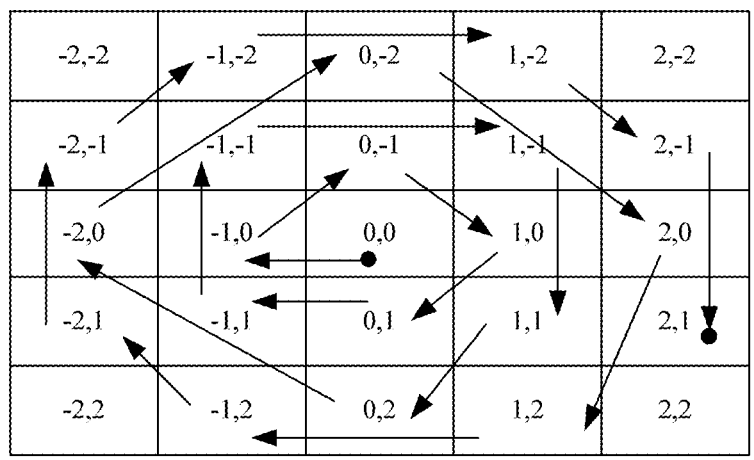

In another example, assuming SR=2, the number of candidate points can be 21, and the sequence of these candidate points is from near to far away from the center, with the motion vector (0,0) taken as the center. Referring to FIG. 7D, the sequence of the candidate points is: {Mv(0,0), Mv(−1,0), Mv(0,−1), Mv(1,0), Mv(0,1), Mv(−1,1), Mv(−1,−1), Mv(1,−1), Mv(1,1), Mv(0,2), Mv(−2,−0), Mv(0,−2), Mv(2,0), Mv(1,2), Mv(−1,2), Mv(−2,1), Mv(−2,−1), Mv(−1,−2), Mv(1,−2), Mv(2,−1), Mv(2,1)}.

The cost values corresponding to the motion vectors of the 21 points are determined, scanning is performed according to the above sequence, the motion vector with the minimum cost value is obtained as the optimal offset MV, the integer-pixel motion vector adjustment value and the sub-pixel motion vector adjustment value can be determined by using the optimal offset MV, and the determination method refers to the above embodiments.

Figure 7E:
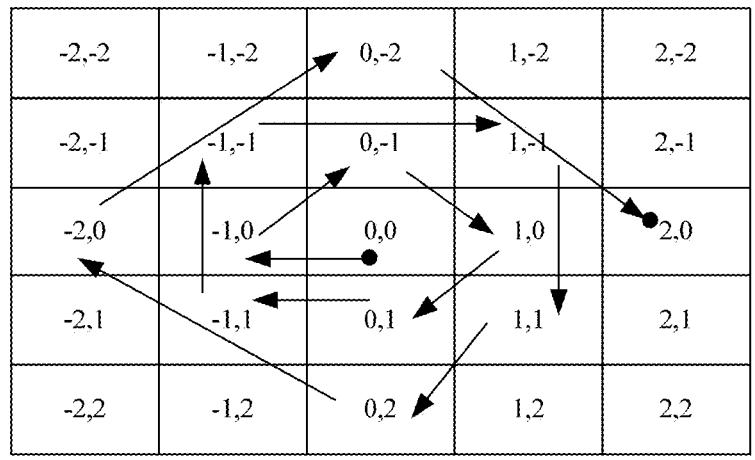

In another example, assuming SR=2, the number of candidate points can be 13, and the sequence of these candidate points is from near to far away from the center, with the motion vector (0,0) taken as the center. Referring to FIG. 7E, the sequence of the candidate points is: {Mv(0,0), Mv(−1,0), Mv(0,−1), Mv(1,0), Mv(0,1), Mv(−1,1), Mv(−1,−1), Mv(1,−1), Mv(1,1), Mv(0,2), Mv(−2,−0), Mv(0,−2), Mv(2,0)}. The cost values corresponding to the motion vectors of the 13 points are determined, scanning is performed according to the above sequence, the motion vector with the minimum cost value is obtained as the optimal offset MV, the integer-pixel motion vector adjustment value and the sub-pixel motion vector adjustment value can be determined by using the optimal offset MV, and the determination method refers to the above embodiments.

Embodiment 25 with respect to step 303 and step 403, the implementation of adjusting the first and second original motion vectors Org_MV0 and Org_MV1 to the first and second target motion vectors Refined_MV0 and Refined_MV1 respectively is similar to that of embodiments 21, 22. In this embodiment, all of the candidate motion vectors to be processed are selected at one time, so that the candidate motion vectors can be processed in parallel to obtain the cost value of each candidate motion vector, thereby reducing the computational complexity and improving the encoding performance.

In this embodiment, some of motion vectors having a offset not exceeding SR is selected from (2*SR+1)*(2*SR+1) points around the original motion vector with the original motion vector taken as the center. For example, N (N is equal to or greater than 1, and equal to or less than (2*SR+1)*(2*SR+1)) candidate points are selected from (2*SR+1)*(2*SR+1) points including the original motion vector. The cost values of the motion vectors corresponding to the N points are determined. The cost values of the N points are scanned in a certain sequence, and the motion vector with the minimum cost value is selected as the optimal motion vector. If the cost values are equal, the candidate points with the highest sequence are preferentially selected.

Embodiment 25 differs from embodiment 24 in that the positions of candidate points in embodiment 24 are all fixed, i.e., are independent of the original motion vector, while the positions of candidate points in embodiment 25 are related to the original motion vector, and the following description is made with reference to several specific examples.

In an example, assuming SR=2, the number of candidate points can be 13, and the sequence of these candidate points is from near to far away from the center, with the motion vector (0,0) taken as the center. Furthermore, the sequence of a first layer candidate points from the center is independent of the size of the original motion vector, while the sequence of a second layer candidate points from the center is dependent on the size of the original motion vector. The sequence of the candidate points is: {Mv(0,0), Mv(−1,0), Mv(0,−1), Mv(1,0), Mv(0,1), Mv(−1,1), Mv(−1,−1), Mv(1,−1), Mv(1,1), Mv(sign_H*2,0), Mv(sign_H*2,sign_V*1), Mv(sign_H*1,sign_V*2), Mv(sign_H*1,sign_V*2)}. The first original motion vector is denoted as MV0, horizontal component is MV0_Hor, and vertical component is MV0_Ver. If the MV0_Hor is greater than or equal to 0, sign_H=1; otherwise sign_H=−1; if the MV0_Ver is greater than or equal to 0, sign_V=1; otherwise sign_V=−1.

The cost values corresponding to the motion vectors of the 13 points are determined, scanning is performed according to the above sequence, the motion vector with the minimum cost value is obtained as the optimal offset MV, the integer-pixel motion vector adjustment value and the sub-pixel motion vector adjustment value can be determined by using the optimal offset MV, and the determination method refers to the above embodiments.

In another example, assuming SR=2, the number of candidate points can be 13, and the sequence of these candidate points is from near to far away from the center, with the motion vector (0,0) taken as the center. Furthermore, the sequence of a first layer candidate points from the center is independent of the size of the original motion vector, while the sequence of a second layer candidate points from the center is dependent on the size of the original motion vector. The sequence of the candidate points is: {Mv(0,0), Mv(−1,0), Mv(0,−1), Mv(1,0), Mv(0,1), Mv(−1,1), Mv(−1,−1), Mv(1,−1), Mv(1,1), Mv(sign_H*2,0), Mv(sign_H*2,sign_V*1), Mv(sign_H*1,sign_V*2), Mv(sign_H*1,sign_V*2)}. The first original motion vector is denoted as MV0, horizontal component is MV0_Hor, and vertical component is MV0_Ver. If the MV0_Hor is greater than 0, sign_H=1; otherwise sign_H=−1; if the MV0_Ver is greater than 0, sign_V=1; otherwise sign_V=−1.

The cost values corresponding to the motion vectors of the 13 points are determined, scanning is performed according to the above sequence, the motion vector with the minimum cost value is obtained as the optimal offset MV, the integer-pixel motion vector adjustment value and the sub-pixel motion vector adjustment value can be determined by using the optimal offset MV, and the determination method refers to the above embodiments.

Embodiment 26 in the above embodiments, the first cost value corresponding to the center motion vector and the second cost value corresponding to the edge motion vector are obtained according to the first pixel value of the first reference block and the second pixel value of the second reference block. The third cost value corresponding to the first original motion vector and the fourth cost value corresponding to the candidate motion vectors are obtained according to the first pixel value of the first reference block and the second pixel value of the second reference block.

In an example, the first cost value corresponding to the center motion vector, the second cost value corresponding to the edge motion vector, the third cost value corresponding to the first original motion vector, and the fourth cost value corresponding to the candidate motion vector can be obtained according to a first pixel value without down-sampling and a second pixel value without down-sampling.

In another example, down-sampling operation on the first and second pixel values is performed; then, according to the first and second pixel values after down-sampling, the first cost value corresponding to the center motion vector, the second cost value corresponding to the edge motion vector, the third cost value corresponding to the first original motion vector, and the fourth cost value corresponding to the candidate motion vector are obtained.

In another example, down-sampling and shifting operation is performed on the first and second pixel values, then, according to the first and second pixel values after shifting and down-sampling, the first cost value corresponding to the center motion vector, the second cost value corresponding to the edge motion vector, the third cost value corresponding to the first original motion vector, and the fourth cost value corresponding to the candidate motion vector are obtained.

The method in which the cost value is determined is similar for different situations. For example, in order to obtain the cost value corresponding to the center motion vector, a sub-reference block A1 corresponding to the center motion vector can be obtained by copying from the first reference block, a sub-reference block B1 corresponding to a motion vector symmetrical to the center motion vector can be obtained by copying from the second reference block, and the cost value corresponding to the center motion vector can be obtained according to the first pixel value of the sub-reference block A1 and the second pixel value of the sub-reference block B1. In order to obtain the cost value corresponding to the edge motion vector, a sub-reference block A2 corresponding to the edge motion vector can be obtained by copying from the first reference block, a sub-reference block B2 corresponding to a motion vector symmetrical to the edge motion vector can be obtained by copying from the second reference block, and the cost value corresponding to the edge motion vector can be obtained according to the first pixel value of the sub-reference block A2 and the second pixel value of the sub-reference block B2, and the like.

To sum up, in order to obtain the cost value corresponding to the motion vector, the sub-reference block corresponding to the motion vector is obtained from the first reference block, the sub-reference block corresponding to the symmetric motion vector of the motion vector is obtained from the second reference block, and then the cost value corresponding to the motion vector is obtained according to the pixel values of the two sub-reference blocks.

Embodiment 27 on the basis of embodiment 26, a cost value corresponding to the motion vector is obtained according to the first pixel value without down-sampling (i.e., a pixel value without down-sampling for the sub-reference block in the first reference block) and the second pixel value without down-sampling (i.e., a pixel value without down-sampling for the sub-reference block in the second reference block).

In an example, assuming that a sub-reference block in the first reference block is $pred_0$ and a sub-reference block in the second reference block is $pred_1$, the cost value is determined according to the SAD of all the pixel values of the sub-reference blocks $pred_0$, $pred_1$, and it is not necessary to perform down-sampling vertically on the pixels of sub-reference blocks $pred_0$, $pred_1$.

Based on all the pixel values of the sub-reference blocks $pred_0$, $pred_1$, the formula of calculating the cost value is:

$$cost=\sum_{i=1}^{H}\sum_{j}^{W} abs(pred_0(i,j)-pred_1(i,j))$$

In the above equation, cost represents a cost value, W represents a width value of the sub-reference block, H represents a height value of the sub-reference block, $pred_0(i,j)$ represents a pixel value of column i and row j of the sub-reference block $pred_0$, $pred_1(i,j)$ represents a pixel value of column i and row j of the sub-reference block $pred_1$, and abs(x) represents an absolute value of x.

Embodiment 28 on the basis of embodiment 26, the down-sampling operation can be performed on the first and second pixel values; a cost value corresponding to the motion vector is obtained according to the first pixel value after down-sampling (i.e., a pixel value after down-sampling for the sub-reference block in the first reference block) and the second pixel value after down-sampling (i.e., a pixel value after down-sampling for the sub-reference block in the second reference block).

In an example, assuming that a sub-reference block in the first reference block is $pred_0$ and a sub-reference block in the second reference block is $pred_1$, the cost value is determined according to the SAD of all the pixel values of the sub-reference blocks $pred_0$, $pred_1$. When the cost value is determined by using the SAD of all pixel values, the down-sampling operation can be performed vertically on the pixel values of the sub-reference blocks $pred_0$, $pred_1$ by N times (N is an integer greater than 0, and may be 2).

Based on all the pixel values of the sub-reference blocks $pred_0$, $pred_1$, the formula of calculating the cost value is:

$$cost=\sum_{i=1}^{H/N}\sum_{j}^{W} abs(pred_0(1+N(i-1),j)-pred_1(1+N(i-1),j))$$

In the above equation, cost represents a cost value, W represents a width value of the sub-reference block, H represents a height value of the sub-reference block; N represents a parameter of down-sampling, and is an integer greater than 0, which may be 2; $pred_0(1+N(i-1), j)$ represents a pixel value of column $1+N(i-1)$ and row j of the sub-reference block $pred_0$, $pred_1(1+N(i-1), j)$ represents a pixel value of column $1+N(i-1)$ and row j of the sub-reference block $pred_1$, and abs(x) represents an absolute value of x.

Embodiment 29 on the basis of the embodiment 26, down-sampling operation is performed on the first and second pixel values, then, according to the first and second pixel values (a pixel value after shifting and down-sampling for the sub-reference block in the first reference block, and a pixel value after shifting and down-sampling for the sub-reference block in the second reference block) after shifting and down-sampling, the cost values corresponding to the motion vectors are obtained.

In an example, assuming that a sub-reference block in the first reference block is $pred_0$, a sub-reference block in the second reference block is $pred_1$, and both $pred_0$, $pred_1$ are stored in the form of D bits, that is, each pixel value in $pred_0$ is stored in D bits, and each pixel value in $pred_1$ is stored in D bits.

If D is equal to or less than 8, the cost value is determined according to the SAD of all the pixel values of the sub-reference blocks $pred_0$, $pred_1$. When the cost value is determined by using the SAD of all pixel values, the down-sampling operation can be performed vertically on the pixel values of the sub-reference blocks $pred_0$, $pred_1$ by N times (N is an integer greater than 0, and may be 2). Based on all the pixel values of the sub-reference blocks $pred_0$, $pred_1$, the cost value calculation equation is:

$$cost=\sum_{i=1}^{H/N}\sum_{j}^{W} abs(pred_0(1+N(i-1),j)-pred_1(1+N(i-1),j))$$

In the above equation, cost represents a cost value, W represents a width value of the sub-reference block, H represents a height value of the sub-reference block; N represents a parameter of down-sampling, and is an integer greater than 0, which may be 2; $pred_0(1+N(i-1), j)$ represents a pixel value of column $1+N(i-1)$ and row j of the sub-reference block $pred_0$, $pred_1(1+N(i-1), j)$ represents a pixel value of column $1+N(i-1)$ and row j of the sub-reference block $pred_1$, and abs(x) represents an absolute value of x. and it can be seen from the above that only the sum of absolute of the differences of row 1, N+1, 2N+1, . . . , is calculated.

If D is greater than 8, all pixel values of the sub-reference blocks $pred_0$, $pred_1$ are first shifted to 8 bits to obtain 8-bit $pred_0$ and 8-bit $pred_1$, denoted as $pred_{0\_8bit(i,j)}$ and $pred_{1\_8bit(i,j)}$. The purpose is to save the storage cost of SAD calculation, and the storage of 8 bits can realize higher parallelism.

$$pred_{0\_8bit}(i,j)=pred_0(i,j)>>(D-8), pred_{1\_8bit}(i,j)=pred_1(i,j)>>(D-8)$$

Then, the down-sampling operation can be performed vertically on the pixel values of 8-bit $pred_0$ and 8-bit $pred_1$ by N times (N is an integer greater than 0, and may be 2), so that the cost value can be calculated as:

$$cost=\sum_{i=1}^{H/N}\sum_{j}^{W} abs(pred_{0\_8bit}(1+N(i-1),j)-pred_{1\_8bit}(1+N(i-1),j))$$

In the above equation, the meaning of each expression is shown in the above embodiments, which will not be repeated here.

Embodiment 30 in step 304 and step 404, for each sub-block of the current block, motion compensation is performed on the sub-block according to the first target motion vector of the sub-block and the second target motion vector of the sub-block. Specifically, the third reference block corresponding to the sub-block is determined according to the first target motion vector of the sub-block, and the fourth reference block corresponding to the sub-block is determined according to the second target motion vector of the sub-block. The third pixel value of the third reference block and the fourth pixel value of the fourth reference block are weighted to obtain the prediction value of the sub-block.

For example, the reference blocks (i.e., the third and fourth reference blocks including three component prediction values, since the target motion vector may be sub-pixel, interpolation is required) in two directions are obtained by interpolating (e.g., 8-tap interpolation) based on two target motion vectors of the sub-block The third pixel value of the third reference block and the fourth pixel value of the fourth reference block are weighted to obtain a final prediction value (three components).

In an example, a fifth reference block corresponding to the sub-block can be determined from a first reference frame based on the first target motion vector of the sub-block, and the third reference block can be obtained by interpolating pixel values in the fifth reference block. A sixth reference block corresponding to the sub-block can be determined from a second reference frame based on the second target motion vector of the sub-block, and a fourth reference block can be obtained by interpolating pixel values in the sixth reference block.

For example, assuming that the size of the current block is W*H, the fifth reference block with a size of A*B can be determined from the first reference frame based on the first target motion vector, the size A*B of the fifth reference block being related to the interpolation method, and where A is greater than W and B is greater than H, and there is no restriction on this. The third reference block with the size of W*H can be obtained by interpolating pixel values in the fifth reference block, and the interpolation method is not limited here. The sixth reference block of size A*B can be determined from the second reference frame based on the second target motion vector, the size A*B of the sixth reference block being related to the interpolation method, and where A is greater than W and B is greater than H. The fourth reference block with the size of W*H can be obtained by interpolating pixel values in the sixth reference block, and the interpolation method is not limited here.

In another example, a seventh reference block corresponding to the sub-block is determined from the first reference frame based on the first target motion vector of the sub-block, an eighth reference block is constructed by using pixel values in the seventh reference block, and interpolates pixel values in the eighth reference block to obtain the third reference block. A ninth reference block corresponding to the sub-block is determined from the second reference frame based on the second target motion vector of the sub-block, a tenth reference block is constructed by using pixel values in the ninth reference block, and interpolate pixel values in the tenth reference block to obtain the fourth reference block.

For example, assuming that the size of the current block is W*H, the seventh reference block with a size of W*H can be determined from the first reference frame based on the first target motion vector. The eighth reference block with a size of A*B is constructed based on the pixel values in the seventh reference block, and the construction method is not limited. The size A*B of the eighth reference block is related to the interpolation method, where A is greater than W and B is greater than H, and there is no restriction on this. Interpolate pixel values in the eighth reference block to obtain the third reference block with a size of W*H, and the interpolation method is not limited.

For example, assuming that the size of the current block is W*H, the ninth reference block with a size of W*H can be determined from the second reference frame based on the second target motion vector. The tenth reference block with a size of A*B is constructed based on the pixel values in the ninth reference block, and the construction method is not limited. The size A*B of the tenth reference block is related to the interpolation method, where A is greater than W and B is greater than H, and there is no restriction on this. Interpolate pixel values in the tenth reference block to obtain the fourth reference block with a size of W*H, and the interpolation method is not limited.

Embodiment 31 after obtaining the target motion vector, based on the target motion vector of each sub-block, prediction values in two directions (i.e. three components Y, U, V, i.e. the prediction value of the third reference block and the prediction value of the fourth reference block) are obtained by an 8-tap interpolation filter, and are weighted to obtain the final prediction values. Referring to FIG. 5, the pixel values of the black area and the white area are obtained from the reference frame, and the pixel values of the gray area are not necessarily obtained from the reference frame, but can be obtained by copying adjacent pixel values.

In an example, firstly, W+FS-1 pixel values in the first row of the white area can be copied to the pixel values in the first SR rows of the gray area. W+FS-1 pixel values in the last row of the white area are copied to the pixel values in the last SR rows of the gray area. Then, H+FS-1 pixel values in the first column of the white area, and SR pixel values of the gray area obtained on the upper side and SR pixel values of the gray area obtained on the lower side can be copied to the pixel values in the first SR columns of the gray area. H+FS-1 pixel values in the last column of the white area, and SR pixel values of the gray area obtained on the upper side and SR pixel values of the gray area obtained on the lower side can be copied to the pixel values in the last SR columns of the gray area.

In another example, firstly, H+FS-1 pixel values in the first column of the white area can be copied to the pixel values in the first SR columns of the gray area. H+FS-1 pixel values in the last column of the white area are copied to the pixel values in the last SR columns of the gray area. Then, W+FS-1 pixel values in the first row of the white area, and SR pixel values of the gray area obtained on the left side and SR pixel values of the gray area obtained on the right side can be copied to the pixel values in the first SR rows of the gray area. W+FS-1 pixel values in the last row of the white area, and SR pixel values of the gray area obtained on the left side and SR pixel values of the gray area obtained on the right side can be copied to the pixel values in the last SR rows of the gray area.

Embodiment 32 after obtaining the target motion vector, based on the target motion vector of each sub-block, prediction values in two directions (i.e. three components Y, U, V, i.e. the prediction value of the third reference block and the prediction value of the fourth reference block) are obtained by an 8-tap interpolation filter, and are weighted to obtain the final prediction values. Referring to FIG. 5, the pixel values of the black area and the white area are obtained from the reference frame, and the pixel values of the gray area are obtained by copying directly from the corresponding area of the reference frame, rather than by copying adjacent pixel values. This method is simple and have better performance, but it increases the amount of access data to the reference frame.

Embodiment 33 after obtaining the target motion vector, based on the target motion vector of each sub-block, prediction values in two directions (i.e. three components Y, U, V, i.e. the predicted value of the third reference block and the predicted value of the fourth reference block) are obtained by a bilinear interpolation filter (instead of the 8-tap interpolation filter), and are weighted to obtain the final prediction values. Referring to FIG. 5, the pixel values of the black area and the white area are obtained from the reference frame. Since the number of taps is relatively small, the pixel values of the gray area are not required.

Embodiment 34 in embodiment 30 to embodiment 33, after obtaining the prediction values in the two directions, the final prediction value is obtained by mean of weighted average (i.e., the prediction values in the two directions have the same weight). Alternatively, after the prediction values in the two directions are obtained, the final predicted value is obtained by weighted average, and the weights of the two prediction values can be different. For example, the weight ratio of two prediction values can be 1:2, 1:3, 2:1, etc.

For the encoding side, weight table can include weight ratio: 1:2, 1:3, 2:1, etc., and the encoding side can determine the cost value of each weight ratio and determine the weight ratio with the minimum cost value, so that the encoding side can obtain a final prediction value through weighted average based on the weight ratio with the minimum cost value.

When the encoding side sends encoding bit stream to the decoding side, the encoding bit stream carries the index value of the weight ratio in the weight table. In this way, the decoding side analyzes the index value of the encoding bit stream, obtains weight ratio corresponding to the index value from the weight table, and obtains the final prediction value by weighted average based on the weight ratio.

In an example, the weight table can include, but is not limited to {−2, 3, 4, 5, 10}. The weight "−2" indicates that the final prediction value=(prediction value 1*(−2)+prediction value 2*(8−(−2))), i.e., (−2*-prediction value 1+10*-prediction value 2)/8. The weight "10" indicates that the weight ratio is 10:−2, i.e. final prediction value=(prediction value 1*(10)+predicted value 2*(−2)), i.e. (10*prediction value 1−2*prediction value 2)/8. The weight "3" indicates a weight ratio of 3:5. The weight "5" indicates a weight ratio of 5:3. The weight "4" indicates a weight ratio of 4:4, i.e., the weight "4" indicates that the weights are the same.

Embodiment 35 in step 305 and step 405, the first and second target motion vectors of each sub-block of the current block need to be stored, and the first and second target motion vectors are used for encoding and decoding reference of a subsequent block. For example, the first and second target motion vectors are used for loop filtering of the current frame; the first and second target motion vectors are used for time domain reference of subsequent frames; and/or the first and second target motion vectors are used for spatial domain reference of the current frame.

For example, the first and second target motion vectors of each sub-block of the current block can be used for motion compensation of the current block, and can also be used for time domain reference of subsequent frames. In another example, the first and second target motion vectors of each sub-block of the current block can be used for motion compensation of the current block, can also be used for a loop filtering of the current block, and can also be used for time domain reference of subsequent frames.

In another example, the first and second target motion vectors of each sub-block of the current block can be used for motion compensation of the current block, can also be used for a loop filtering of the current block, can also be used for time domain reference of subsequent frames, and can also be used for a spatial domain reference of the current frame, which will be described below.

Figure 8:
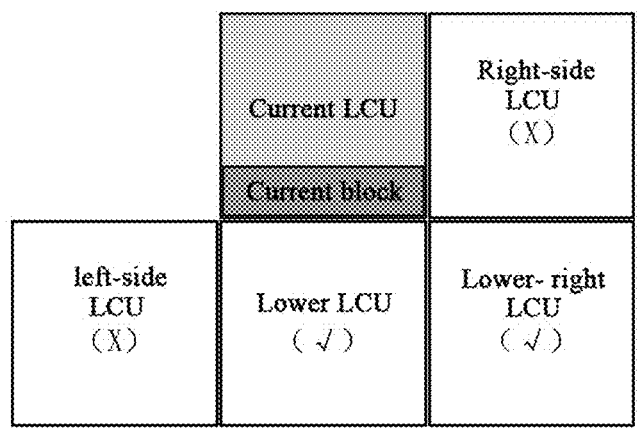
FIG. 8 is a schematic diagram of the spatial domain reference of a current block according to an embodiment of the present application.

The first and second target motion vectors of each sub-block of the current block can be used for spatial domain reference of blocks within certain LCUs (Largest Coding units) in spatial domain. Since the encoding sequence is from top to bottom and from left to right, the motion vector of the current block can be referenced by other blocks within the current LCU, as well as by blocks within the subsequent adjacent LCU. Since the amount of calculation required for obtaining the target motion vector is large, if the subsequent blocks refer to the target motion vector of the current block, it will take a long time to wait. In order to avoid the time delay caused by excessive waiting, only a few spatial domain adjacent blocks are allowed to refer to the target motion vector of the current block, and other blocks refer to the original motion vector of the current block. Referring to FIG. 8, the few blocks include sub-blocks located in a lower LCU and a lower-right LCU located at a lower side of the current LCU, and sub-blocks located in a right-side LCU and a lower-left LCU may not refer to the target motion vector of the current block.

Embodiment 36 the following describes an adjustment process of a motion vector with reference to a specific example. The specific steps of the motion vector adjustment can be as follows, the following "copy" indicates obtaining without interpolation, if the MV is integer-pixel offset, it can be directly copied from the reference frame, otherwise interpolation is needed.

At step e1, if the current block adopts merge or skip mode, the subsequent processing is executed.

At step e2, the reference pixel values are prepared (assuming the width of the current block is W and the height is H).

An integer-pixel block is prepared for step e3: on the basis of the original motion vector (original motion vector of list0 is denoted as Org_MV0, original motion vector of list1 is denoted as Org_MV1), integer-pixel blocks of three components having two blocks of area (W+FS-1) (H+FS-1) are copied at the respective position of respective reference frames.

An integer-pixel block is prepared for step e4: on the basis of the integer-pixel blocks with area of (W+FS-1)*(H+FS-1), the integer-pixel blocks of three components with area of (W+FS-1) (H+FS-1) are expanded up, down, left and right by SR rows/columns, and after expansion, integer-pixel blocks of three components with area of (W+FS-1+2*SR)*(H+FS-1+2*SR) are obtained, which are denoted as Pred_Inter0, Pred_Inter1 as shown in FIG. 5.

A first motion compensation is performed based on motion information in two different directions. For example, for the luminance component (since the subsequent search process only calculates a cost value using the luminance component to reduce complexity), initial reference pixel prediction values (denoted as Pred_Bilinear0, Pred_Bilinear1) with the size of (W+2 SR)*((H+2 SR)) can be obtained by bilinear interpolation based on two integer-pixel reference blocks with the area of (W+FS-1)*(H+FS-1). FS is the number of filter taps, and is default 8, and SR is the search range, i.e., the maximum horizontal/vertical component interpolation of the target motion vector and the original motion vector, and is default 2. Pred_Bilinear0/Pred_Bilinea1 is used in step e3.

At step e3, for each dx*dy sub-block (16*16 or less integer block) of the current block, the target motion vectors are respectively obtained (two target motion vectors are respectively denoted as Refined_MV0 and Refined_MV1).

At step e31, SR iterations are performed to obtain an optimal integer-pixel offset of the integer-pixel MV point, which is denoted as IntegerDeltaMV, and IntegerDeltaMV is initialized to (0,0), and performing the subsequent processing for each iteration:

at step e311, deltaMV is set to (0,0). If the first iteration is performed, two prediction value blocks (i.e., block of the most center W*H of Pred_Bilinear0/1) are obtained by copying based on the original motion vectors in the reference pixel Pred_Bilinear0/1; and an initial cost value, i.e., the SAD after the down-sampling operation is performed vertically on the prediction value blocks in two directions by 2 times, is obtained based on the two prediction value blocks.

If the initial cost value is less than 4*dx*dy/2, and dx and dy are the width and height of the current sub-block, the subsequent search process is directly skipped, step e32 is executed, and notZeroCost is set to false.

At step e312, as shown in FIG. 6, five offset MVs (which are all referred to as MVOffset) are sequentially obtained according to the sequence of {Mv(0,1), Mv(0,−1), Mv(1,0), Mv(−1,0), Mv(right,down)}, with the above initial point taken as the center, and the calculation and comparison process of the cost values of these five offset MVs is performed.

For example, based on a certain MVOffset, in the reference pixel Pred_Bilinear0/1, two prediction value blocks (e.g., a W*H block with center position offset MVOffset in the Pred_Bilinear0, and a W*H block with center position offset −MVOffset (opposite to list0) in the Pred_Bilinear1) are obtained from this MVOffset, and the down-sampling SAD of the two prediction value blocks are calculated as the cost value of MVOffset. Then, the MVOffset (stored in deltaMV) with the minimum cost value is reserved, which is used as a new center offset point of the next iteration.

The default value of Mv(right,down) is (−1,−1), if the cost value of Mv(1,0) is less than that of Mv(−1,−0), right is 1; if the cost value of Mv(0,1) is less than that of Mv(0,−1), down is 1.

IntegerDeltaMV is updated based on the value of deltaMV: IntegerDeltaMV:=IntegerDeltaMV+deltaMV.

At step e313, after iteration, if the optimal MV is still the initial MV or the minimum cost value is 0, the next iterative search process is not performed, step e32 is executed, and notZeroCost is set as false. Otherwise, if the iteration times reach SR, step e32 is executed, and if the iteration times do not reach SR, the optimal MV is taken as the center, and the next iterative search process is performed, that is, step e311 is returned to.

At step e32, the optimal integer-pixel MV point in step e31 is taken as the center, the optimal sub-pixel offset MV is obtained, which is denoted as SPMV, and the SPMV is initialized to (0,0), and then performing the subsequent procedure:

At step e321, subsequent procedure is only performed when notZeroCost is not false and deltaMV is (0,0), otherwise, the original motion vector is directly adjusted by using IntegerDeltaMV.

At step e322, E(x,y) is represented as the cost value corresponding to the MV of the optimal MV point offset (x,y) obtained in step e31 (the cost value calculated in step e31). Based on the E(x,y) of the center, top, bottom, left and right points, the offset $(x_0,y_0)$ of the point with the smallest E(x,y) can be obtained as follows: $x_0=N*(E(-1,0)-E(1,0))/(E(-1,0)+E(1,0)-2*E(0,0))$, $y_0=N*(E(0,-1)-E(0,1))/(E(0,-1)+E(0,1)-2*E(0,0))$.

In an example, when the motion vector pixel precision is ½, ¼, ⅛, and 1/16, N=1, 2, 4, and 8 respectively. Then, $(x_0,y_0)$ is assigned to deltaMv, SPMV=deltaMv/2N, and if the current motion vector pixel precision is 1/16, the SPMV can be $(x_0/16, y_0/16)$.

If E(−1,−0)=E(0,0), a shift is performed by half a pixel horizontally to the left (deltaMv[0]=−N).

If E(1,0)=E(0,0), a shift is performed by half a pixel horizontally to the right (deltaMv[0]=N).

If E(0,−1)=E(0,0), a shift is performed by half a pixel vertically upward (deltaMv [1]=−N).

If E(0,−1)=E(0,0), a shift is performed by half a pixel vertically downward (deltaMv [1]=N).

At step e33, the optimal offset MV is obtained based on the integer-pixel offset integrarteltaMV in step e31 and the sub-pixel offset SPMV in step e32, which is denoted as BestMVoffset. BestMVoffset=IntegerDeltaMV+SPMV. Based on BestMVoffset, target motion vectors in two directions can be obtained: Refined_MV0=Org_MV0+BestMVoffset; Refined_MV1=Org_MV1−BestMVoffset.

At step e4, prediction values in two directions are obtained by 8-tap interpolation based on the target motion vector of each sub-block, and weighted to obtain final the prediction value (three components). For example, based on the target motion vectors Refined_MV0 and Refined_MV1 of each sub-block, in Pred_Inter0/1 obtained by step e2, the corresponding prediction block is obtained by interpolation (the motion vectors may be sub-pixel, and interpolation is required to obtain the corresponding pixel block).

At step e5, the target motion vector is used for motion compensation of the current block and time domain reference of the subsequent frame.

Embodiment 37 the above embodiments can be implemented individually or in any combination. For example, embodiments 13, 15, 24 and 29 can be implemented individually. Embodiment 13 and embodiment 15 are implemented in combination, embodiment 13 and embodiment 24 are implemented in combination, embodiment 13 and embodiment 29 are implemented in combination, embodiment 15 and embodiment 24 are implemented in combination, embodiment 15 and embodiment 29 are implemented in combination, embodiment 24 and embodiment 29 are implemented in combination, embodiment 13, embodiment 15 and embodiment 24 are implemented in combination, embodiment 13, embodiment 15 and embodiment 29 are implemented in combination, embodiment 15, embodiment 24 and embodiment 29 are implemented in combination, embodiment 13, embodiment 15, embodiment 24 and embodiment 29 are implemented in combination, and the like. Of course, the above are only some examples which are not limited hereto. All the embodiments of the present application can be implemented individually or in combination.

Embodiment 38

Figure 9:
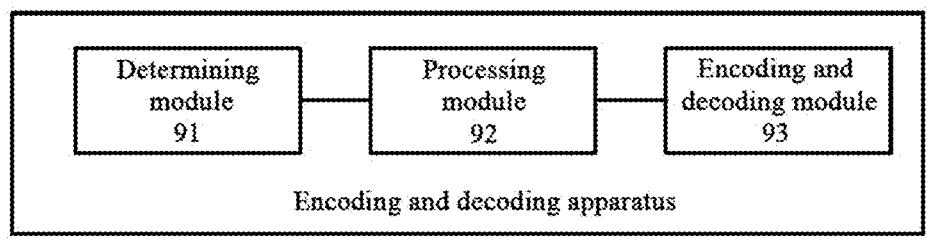
FIG. 9 is a structural diagram of an encoding and decoding apparatus according to an embodiment of the present application.

Based on the same concept as the method, an embodiment of the present application further relates to an encoding and decoding apparatus, which is applied to an encoding side or a decoding side, as shown in FIG. 9 which is a structural diagram of the apparatus, where the apparatus includes:

a determining module 91 configured for, if characteristic information of a current block meets a specific condition, determining a first reference block corresponding to the current block according to a first original motion vector of the current block, and determining a second reference block corresponding to the current block according to a second original motion vector of the current block; a processing module 92 configured for adjusting the first and second original motion vectors according to a first pixel value of the first reference block and a second pixel value of the second reference block to obtain a first target motion vector corresponding to the first original motion vector and a second target motion vector corresponding to the second original motion vector; and an encoding and decoding module 93 configured for encoding or decoding the current block according to the first and second target motion vectors.

The characteristic information includes one or more of the following: a motion information prediction mode corresponding to the current block; a motion information attribute corresponding to the current block; size information of the current block.

If the characteristic information is the motion information prediction mode corresponding to the current block, the determining module 91 is further configured for: if the motion information prediction mode corresponding to the current block is a regular merge mode, determining that the motion information prediction mode corresponding to the current block meets the specific condition; or, if the motion information prediction mode corresponding to the current block is a merge mode for generating a new prediction value by combining the inter-frame prediction value and the intra-frame prediction value, determining that the motion information prediction mode corresponding to the current block meets the specific condition.

If the characteristic information is a motion information attribute corresponding to the current block, the determining module 91 is further configured for: if the motion information attribute corresponding to the current block is that the motion information of the current block includes motion information in two different directions, determining that the motion information attribute corresponding to the current block meets the specific condition; or, if the motion information attribute corresponding to the current block is that the motion information of the current block includes motion information in two different directions, and the distances between the current frame and each of two reference frames corresponding to the motion information in the two different directions are the same, determining that the motion information attribute corresponding to the current block meets the specific condition; or if the motion information attribute corresponding to the current block is that the current block reuses the motion information of surrounding blocks, determining that the motion information attribute corresponding to the current block meets the specific condition; or, if the motion information attribute corresponding to the current block is that the motion information of each sub-block of the current block is the same, determining that the motion information attribute corresponding to the current block meets the specific condition.

If the characteristic information is size information of the current block, the size information of the current block includes a width value and a height value of the current block, the determining module 91 is further configured for: if the width value of the current block is within a range of a first interval [a first threshold, a second threshold], determining that the size information of the current block meets the specific condition; or, if the height value of the current block is within a range of a second interval [a third threshold, a fourth threshold], determining that the size information of the current block meets the specific condition; or, if the area derived from the width value and the height value of the current block is within a range of a third interval [a fifth threshold, a sixth threshold], determining that the size information of the current block meets the specific condition; or, if the width value is within the range of the first interval [the first threshold, the second threshold], the height value is within the range of the second interval [the third threshold, the fourth threshold], and the area is within the range of the third interval [the fifth threshold, the sixth threshold], determining that the size information of the current block meets the specific condition.

The determining module 91 is configured for determining the first reference block corresponding to the current block according to the first original motion vector of the current block, and determining the second reference block corresponding to the current block according to the second original motion vector of the current block, which is specifically for: determining the first reference block corresponding to the current block from the first reference frame based on the first original motion vector of the current block; and determining the second reference block corresponding to the current block from the second reference frame based on the second original motion vector of the current block; wherein the first pixel value of each pixel point in the first reference block is obtained by interpolating pixel values of adjacent pixel points in the first reference block, or is obtained by copying the pixel values of adjacent pixel points in the first reference block; the second pixel value of each pixel point in the second reference block is obtained by interpolating pixel values of adjacent pixel points in the second reference block, or by copying the pixel values of adjacent pixel points in the second reference block.

The processing module 92 is configured for adjusting the first and second original motion vectors according to the first pixel value of the first reference block and the second pixel value of the second reference block to obtain the first target motion vector corresponding to the first original motion vector and the second target motion vector corresponding to the second original motion vector, which is specifically for:

when the current block includes at least one sub-block, for each sub-block of the current block, adjusting the first and second original motion vectors according to the first and second pixel values to obtain the first and second target motion vectors of the sub-block.

For example, determining a first integer-pixel motion vector adjustment value and a second integer-pixel motion vector adjustment value of the sub-block, and/or a first sub-pixel motion vector adjustment value and a second sub-pixel motion vector adjustment value of the sub-block according to the first and second pixel values; adjusting the first original motion vector according to the first integer-pixel motion vector adjustment value and/or the first sub-pixel motion vector adjustment value to obtain the first target motion vector of the sub-block; and adjusting the second original motion vector according to the second integer-pixel motion vector adjustment value and/or the second sub-pixel motion vector adjustment value to obtain the second target motion vector of the sub-block.

The processing module 92 is configured for determining the first and second integer-pixel motion vector adjustment values of the sub-block, the first and second sub-pixel motion vector adjustment values of the sub-block according to the first and second pixel values, which is specifically for:

determining the first original motion vector or the second original motion vector as a center motion vector;

determining an edge motion vector corresponding to the center motion vector;

obtaining a first cost value corresponding to the center motion vector and a second cost value corresponding to the edge motion vector according to the first and second pixel values;

selecting a motion vector from the center motion vector and the edge motion vector as an optimal motion vector according to the first cost value and the second cost value;

judging whether an end condition is met; if not, determining the optimal motion vector as the center motion vector, and returning to execute determining the edge motion vector corresponding to the center motion vector;

if yes, determining the first and second integer-pixel motion vector adjustment values of the sub-block according to the optimal motion vector; and determining the first and second sub-pixel motion vector adjustment values of the sub-block according to the optimal motion vector.

The processing module 92 is configured for determining the edge motion vector corresponding to the center motion vector, which is specifically for:

shifting the center motion vector (x,y) towards different directions by S, and sequentially obtaining edge motion vector (x,y+S), edge motion vector (x,y−S), edge motion vector (x+S,y), edge motion vector (x−S,y) and edge motion vector (x+right,y+down) in different directions; or shifting the center motion vector (x,y) towards different directions by S, and sequentially obtaining edge motion vector (x,y−S), edge motion vector (x,y+S), edge motion vector (x−S,y), edge motion vector (x+S,y) and edge motion vector (x+right,y+down) in different directions;

wherein default value of the edge motion vector (x+right, y+down) is (x−S,y−S);

if the cost value of the edge motion vector (x+S,y) is smaller than the cost value of the edge motion vector (x−S,y), right is S; if the cost value of the edge motion vector (x, y+S) is less than that of the edge motion vector (x,y−S), down is S; or if the cost value of the edge motion vector (x+S,y) is less than or equal to the cost value of the edge motion vector (x−S,y), right is S; if the cost value of the edge motion vector (x,y+S) is less than or equal to the cost value of the edge motion vector (x,y−S), down is S.

The processing module 92 is configured for obtaining the first cost value corresponding to the center motion vector and the second cost value corresponding to the edge motion vector according to the first and second pixel values, which is specifically for:

acquiring the first cost value corresponding to the center motion vector and the second cost value corresponding to the edge motion vector according to the first and second pixel values without down-sampling; or performing down-sampling operation on the first and second pixel values; and obtaining the first cost value corresponding to the center motion vector and the second cost value corresponding to the edge motion vector according to the first and second pixel values after down-sampling; or performing shifting and down-sampling operation on the first pixel value, and performing shifting and down-sampling operation on the second pixel value; and acquiring the first cost value corresponding to the center motion vector and the second cost value corresponding to the edge motion vector according to the first and second pixel values after shifting and down-sampling.

The processing module 92 is configured for determining the first and second integer-pixel motion vector adjustment values of the sub-block, the first and second sub-pixel motion vector adjustment values of the sub-block according to the first and second pixel values, which is specifically for:

taking the first original motion vector or the second original motion vector as a center, selecting some or all of the motion vectors from surrounding motion vectors, and determining the selected motion vectors as candidate motion vectors;

acquiring a third cost value corresponding to the first original motion vector or the second original motion vector and a fourth cost value corresponding to each of the candidate motion vectors according to the first and second pixel values;

selecting a motion vector from the first original motion vector or the second original motion vector and the candidate motion vector as an optimal motion vector according to the third cost value and the fourth cost value;

determining the first and second integer-pixel motion vector adjustment values of the sub-block according to the optimal motion vector; and determining the first and second sub-pixel motion vector adjustment values of the sub-block according to the optimal motion vector.

The processing module 92 is configured for determining the first and second integer-pixel motion vector adjustment values of the sub-block according to the optimal motion vector, which is specifically for: determining the first integer-pixel motion vector adjustment value of the sub-block according to the optimal motion vector and the first original motion vector, and determining the second integer-pixel motion vector adjustment value of the sub-block according to the first integer-pixel motion vector adjustment value.

The processing module 92 is configured for determining the first and second sub-pixel motion vector adjustment values of the sub-block according to the optimal motion vector, which is specifically for: determining the first sub-pixel motion vector adjustment value of the sub-block according to the cost value corresponding to the optimal motion vector and the cost value corresponding to the edge motion vector corresponding to the optimal motion vector, and determining the second sub-pixel motion vector adjustment value of the sub-block according to the first sub-pixel motion vector adjustment value.

The encoding and decoding module 93 is configured for encoding or decoding the current block according to the first and second target motion vectors, which is specifically for: when the current block includes at least one sub-block, for each sub-block of the current block, determining a third reference block corresponding to the sub-block according to the first target motion vector of the sub-block, and determining a fourth reference block corresponding to the sub-block according to the second target motion vector of the sub-block; weighting a third pixel value of the third reference block and a fourth pixel value of the fourth reference block to obtain a prediction value of the sub-block; and determining a prediction value of the current block according to the prediction value of each sub-block.

The encoding and decoding module 93 is configured for determining the third reference block corresponding to the sub-block according to the first target motion vector of the sub-block, and determining the fourth reference block corresponding to the sub-block according to the second target motion vector of the sub-block, which is specifically for: determining a fifth reference block corresponding to the sub-block from the first reference frame based on the first target motion vector of the sub-block, and interpolating pixel values in the fifth reference block to obtain the third reference block; determining a sixth reference block corresponding to the sub-block from the second reference frame based on the second target motion vector of the sub-block, and interpolating pixel values in the sixth reference block to obtain the fourth reference block.

The encoding and decoding module 93 is configured for determining the third reference block corresponding to the sub-block according to the first target motion vector of the sub-block, and determining the fourth reference block corresponding to the sub-block according to the second target motion vector of the sub-block, which is specifically for: determining a seventh reference block corresponding to the sub-block from the first reference frame based on the first target motion vector of the sub-block, constructing an eighth reference block by using pixel values in the seventh reference block, and interpolating pixel values in the eighth reference block to obtain the third reference block; determining a ninth reference block corresponding to the sub-block from the second reference frame based on the second target motion vector of the sub-block, constructing a tenth reference block by using pixel values in the ninth reference block, and interpolating pixel values in the tenth reference block to obtain the fourth reference block.

The apparatus further includes: a storing module for storing the first and second target motion vectors for the current block; wherein the first and second target motion vectors are used for loop filtering of the current frame, the first and second target motion vectors are used for time domain reference of subsequent frames, and/or the first and second target motion vectors are used for spatial domain reference of the current frame.

Embodiment 39

Figure 10:
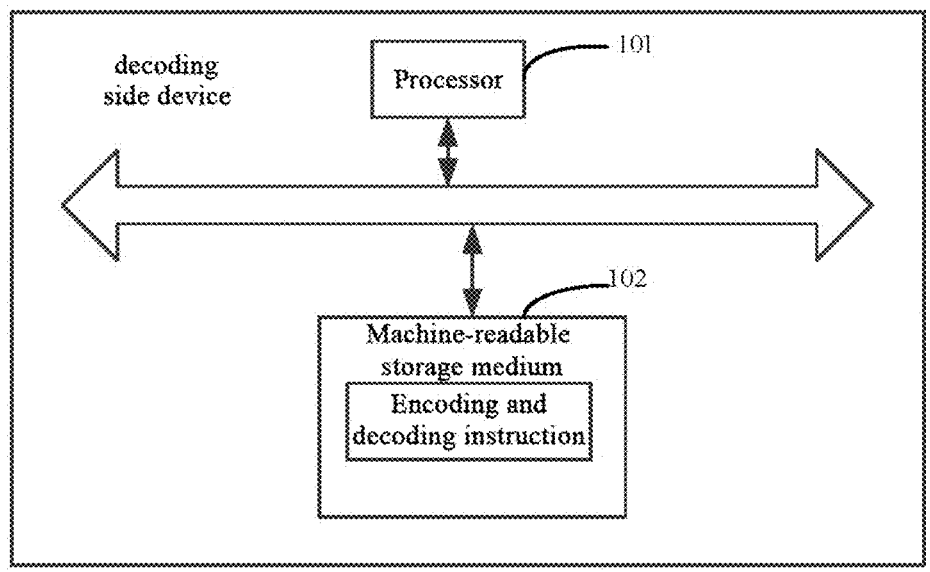
FIG. 10 is a hardware structure diagram of a decoding-side device according to an embodiment of the present application.

The decoding-side device according to the embodiment of the present application, in terms of a hardware level, a hardware structure diagram of the decoding-side device can specifically refer to FIG. 10. The device includes: a processor 101 and a machine-readable storage medium 102, wherein the machine-readable storage medium 102 has stored thereon machine-executable instructions executable by the processor 101; the processor 101 is configured for executing the machine-executable instructions to implement the methods disclosed in the above examples of the present application. For example, the processor is used to execute machine-executable instructions to implement the steps of:

if characteristic information of a current block meets a specific condition, determining a first reference block corresponding to the current block according to a first original motion vector of the current block, and determining a second reference block corresponding to the current block according to a second original motion vector of the current block; adjusting the first and second original motion vectors according to a first pixel value of the first reference block and a second pixel value of the second reference block to obtain a first target motion vector corresponding to the first original motion vector and a second target motion vector corresponding to the second original motion vector; and decoding the current block according to the first and second target motion vectors.

Figure 11:
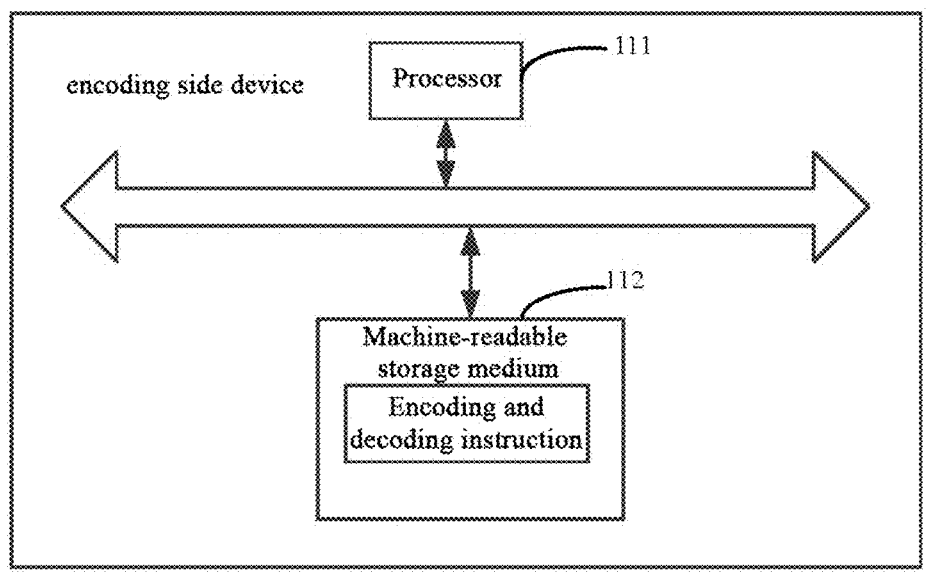
FIG. 11 is a hardware structure diagram of an encoding-side device according to an embodiment of the present application.

The encoding-side device according to the embodiment of the present application, in terms of a hardware level, a hardware structure diagram of the encoding-side device can specifically refer to FIG. 11. The device includes: a processor 111 and a machine-readable storage medium 112, wherein the machine-readable storage medium 112 has stored thereon machine-executable instructions executable by the processor 111; the processor 111 is configured for executing the machine-executable instructions to implement the methods disclosed in the above examples of the present application. For example, the processor 111 is used to execute machine-executable instructions to implement the steps of: if characteristic information of a current block meets a specific condition, determining a first reference block corresponding to the current block according to a first original motion vector of the current block, and determining a second reference block corresponding to the current block according to a second original motion vector of the current block; adjusting the first and second original motion vectors according to a first pixel value of the first reference block and a second pixel value of the second reference block to obtain a first target motion vector corresponding to the first original motion vector and a second target motion vector corresponding to the second original motion vector; and encoding the current block according to the first and second target motion vectors.

Based on the same concept as the method, the embodiment of the present application further relates to a machine-readable storage medium, wherein the machine-readable storage medium has stored thereon a plurality of computer instructions, and when the computer instructions are executed by a processor, the encoding and decoding methods disclosed in the above examples of the present application can be implemented. The machine-readable storage medium may be any electronic, magnetic, optical, or other physical storage apparatus that can contain or store information such as executable instructions, data, and the like. For example, the machine-readable storage medium can be: RAM (Random Access Memory), volatile memory, non-volatile memory, flash memory, a storage drive (e.g., a hard drive), a solid state drive, any type of storage disk (e.g., a compact disk, a DVD, etc.), or similar storage medium, or a combination thereof.

The systems, apparatuses, modules or units described in the above embodiments can be specifically implemented by a computer chip or an entity, or implemented by a product with certain functions. A typical implementation device is a computer, which can be in the form of a personal computer, laptop, cellular telephone, camera phone, smart phone, personal digital assistant, media player, navigation device, email messaging device, game console, tablet computer, wearable device, or a combination of any of these devices.

For ease of description, the above devices are separately described in various units according to their functions. Of course, when implementing this application, the functions of each unit can be realized in one or more software and/or hardware.

Those skilled in the art will appreciate that the embodiments of the present application may be disclosed by the methods, systems, or computer program products. Accordingly, the present application may take the form of an entirely hardware embodiment, an entirely software embodiment or an embodiment combining software and hardware aspects. Furthermore, embodiments of the present application may take the form of a computer program product embodied on one or more computer-usable storage media (including, but not limited to, disk storage, CD-ROM, optical storage, and the like) having computer-usable program code embodied therein.

The present application is described with reference to flowchart illustrations and/or block diagrams of methods, devices (systems), and computer program products according to embodiments of the application. It will be understood that each flow and/or block of the flowchart illustrations and/or block diagrams, and combinations of flows and/or blocks of the flowchart illustrations and/or block diagrams, can be implemented by computer program instructions. These computer program instructions can be provided to a processor of a general purpose computer, special purpose computer, embedded processor, or other programmable data processing device to produce a machine, such that the instructions, which execute via the processor of the computer or other programmable data processing device, produce apparatus for implementing the functions specified in the flowchart flow or flows and/or block diagram block or blocks.

Furthermore, these computer program instructions can also be stored in a computer-readable memory that can direct a computer or other programmable data processing apparatus to function in a particular manner, such that the instructions stored in the computer-readable memory produce an article of manufacture including instruction apparatus which implement the function specified in the flowchart flow or flows and/or block diagram block or blocks.

These computer program instructions can also be loaded onto a computer or other programmable data processing apparatus to cause a series of operational steps to be performed on the computer or other programmable device to produce a computer implemented process such that the instructions which execute on the computer or other programmable apparatus relates to steps for implementing the functions specified in the flowchart flow or flows and/or block diagram block or blocks.

The above description is only an embodiment of the present application and is not intended to limit the present application. Various modifications and changes may occur to those skilled in the art to which the present application pertains. Any modification, equivalent replacement, improvement or the like made within the spirit and principle of the present application shall be included in the scope of the claims of the present application.

What is claimed is:

1. A decoding method, comprising:
when a current block enables a motion vector refinement mode, determining prediction values of sub-blocks of the current block, and determining a prediction value of the current block according to the prediction values of sub-blocks of the current block, wherein for each sub-block of the current block, determining a prediction value of a sub-block comprises:
obtaining motion information of the current block comprising a first original motion vector and a first reference frame, a second original motion vector and a second reference frame;
determining a first reference block corresponding to the sub-block according to the first original motion vector of the current block, and determining a second reference block corresponding to the sub-block according to the second original motion vector of the current block;
obtaining an optimal motion vector according to pixel values of the first reference block and pixel values of the second reference block, wherein obtaining an optimal motion vector comprises:
taking an initial motion vector as a center, selecting motion vectors from the motion vectors containing the initial motion vector and motion vectors surrounding the initial motion vector, and determining the selected motion vectors as candidate motion vectors; wherein the initial motion vector is the first original motion vector or the second original motion vector; obtaining a cost value corresponding to the initial motion vector and cost values corresponding to the candidate motion vectors according to the pixel values of the first reference block and the pixel values of the second reference block; selecting a motion vector from the initial motion vector and the candidate motion vectors as the optimal motion vector according to the cost value corresponding to the initial motion vector and the cost values corresponding to the candidate motion vectors;
adjusting the first original motion vector and the second original motion vector according to the optimal motion vector to obtain a first target motion vector corresponding to the first original motion vector and a second target motion vector corresponding to the second original motion vector;
determining the prediction value of the sub-block according to the first target motion vector and the second target motion vector; wherein determining the prediction value of the sub-block according to the first target motion vector and the second target motion vector comprises: determining a third reference block corresponding to the sub-block according to the first target motion vector, and determining a fourth reference block corresponding to the sub-block according to second target motion vector; weighting pixel values of the third reference block and pixel values of the fourth reference block to obtain the prediction value of the sub-block.

2. The method of claim 1, wherein,
taking an initial motion vector as a center, selecting motion vectors from the motion vectors containing the initial motion vector and the motion vectors surrounding the initial motion vector, and determining the selected motion vectors as candidate motion vectors, comprises: taking the initial motion vector as a center, searching 25 motion vectors containing the initial motion vector at a search range of 2, and determining the 25 motion vectors as candidate motion vectors; wherein a searching sequence of the 25 motion vectors is as follows: {Mv(−2,−2), Mv(−1,−2), Mv(0,−2), Mv(1,−2), Mv(2,−2), Mv(−2,−1), Mv(−1,−1), Mv(0,−1), Mv(1,−1), Mv(2,−1), Mv(−2,0), Mv(−1,0), Mv(0,0), Mv(1,0), Mv(2,0), Mv(−2,1), Mv(−1,1), Mv(0,1), Mv(1,1), Mv(2,1), Mv(−2,2), Mv(−1,2), Mv(0,2), Mv(1,2), Mv(2,2)}.

3. The method of claim 1, wherein,
obtaining a cost value corresponding to the initial motion vector and cost values corresponding to the candidate motion vectors according to the pixel values of the first reference block and the pixel values of the second reference block comprises:
obtaining cost values corresponding to the candidate motion vectors comprises: determining first sub-reference blocks corresponding to the candidate motion vectors based on the first reference block, and determining second sub-reference blocks corresponding to the candidate motion vectors based on the second reference block; calculating a sum of absolute differences of pixel point sample values in the first sub-reference blocks and the second sub-reference blocks by using a down-sampling operation performed vertically by 2 times; determining the cost values corresponding to the candidate motion vectors according to the obtained sum of absolute differences;

obtaining a cost value corresponding to the initial motion vector comprises: determining a first sub-reference block corresponding to the initial motion vector based on the first reference block, and determining a second sub-reference block corresponding to the initial motion vector based on the second reference block; calculating a sum of absolute differences of pixel point sample values in the first sub-reference block and the second sub-reference block by using a down-sampling operation performed vertically by 2 times; determining the cost value corresponding to the initial motion vector according to the obtained sum of absolute differences.

4. The method of claim 1, wherein, adjusting the first original motion vector and the second original motion vector according to the optimal motion vector to obtain a first target motion vector corresponding to the first original motion vector and a second target motion vector corresponding to the second original motion vector comprises:

determining a first integer-pixel motion vector adjustment value and a second integer-pixel motion vector adjustment value according to the optimal motion vector; adjusting the first original motion vector according to the first integer-pixel motion vector adjustment value to obtain the first target motion vector corresponding to the first original motion vector; and adjusting the second original motion vector according to the second integer-pixel motion vector adjustment value to obtain the second target motion vector corresponding to the second original motion vector.

5. The method of claim 4, wherein, determining a first integer-pixel motion vector adjustment value and a second integer-pixel motion vector adjustment value according to the optimal motion vector comprises:

determining the first integer-pixel motion vector adjustment value according to the optimal motion vector, wherein the first integer-pixel motion vector adjustment value is equal to a difference between the optimal motion vector and the initial motion vector;

determining the second integer-pixel motion vector adjustment value according to the first integer-pixel motion vector adjustment value; wherein the second integer-pixel motion vector adjustment value and the first integer-pixel motion vector adjustment value are opposite numbers to each other.

6. The method of claim 4, wherein, adjusting the first original motion vector according to the first integer-pixel motion vector adjustment value to obtain the first target motion vector corresponding to the first original motion vector, and adjusting the second original motion vector according to the second integer-pixel motion vector adjustment value to obtain the second target motion vector corresponding to the second original motion vector comprises:

the first target motion vector is equal to a sum of the first original motion vector and the first integer-pixel motion vector adjustment value; the second target motion vector is equal to a sum of the second original motion vector and the second integer-pixel motion vector adjustment value.

7. The method of claim 1, wherein, adjusting the first original motion vector and the second original motion vector according to the optimal motion vector to obtain a first target motion vector corresponding to the first original motion vector and a second target motion vector corresponding to the second original motion vector comprises:

determining a first integer-pixel motion vector adjustment value, a first sub-pixel motion vector adjustment value, a second integer-pixel motion vector adjustment value and a second sub-pixel motion vector adjustment value according to the optimal motion vector; adjusting the first original motion vector according to the first integer-pixel motion vector adjustment value and the first sub-pixel motion vector adjustment value to obtain the first target motion vector of the sub-block; and adjusting the second original motion vector according to the second integer-pixel motion vector adjustment value and the second sub-pixel motion vector adjustment value to obtain the second target motion vector of the sub-block;

wherein determining a first integer-pixel motion vector adjustment value and a first sub-pixel motion vector adjustment value according to the optimal motion vector comprises: determining the first integer-pixel motion vector adjustment value according to the optimal motion vector, wherein the first integer-pixel motion vector adjustment value is equal to a difference between the optimal motion vector and the initial motion vector; and determining the first sub-pixel motion vector adjustment value according to a cost value corresponding to the optimal motion vector and cost values corresponding to edge motion vectors corresponding to the optimal motion vector.

8. The method of claim 1, wherein, adjusting the first original motion vector and the second original motion vector according to the optimal motion vector to obtain a first target motion vector corresponding to the first original motion vector and a second target motion vector corresponding to the second original motion vector comprises:

determining a first integer-pixel motion vector adjustment value and a first sub-pixel motion vector adjustment value according to the optimal motion vector; obtaining an optimal offset motion vector according to the first integer-pixel motion vector adjustment value and the first sub-pixel motion vector adjustment value;

adjusting the first original motion vector based on the optimal offset motion vector to obtain the first target motion vector; adjusting the second original motion vector based on an opposite number of the optimal offset motion vector to obtain the second target motion vector;

wherein determining a first integer-pixel motion vector adjustment value and a first sub-pixel motion vector adjustment value according to the optimal motion vector comprises: determining the first integer-pixel motion vector adjustment value according to the optimal motion vector, wherein the first integer-pixel motion vector adjustment value is equal to a difference between the optimal motion vector and the initial motion vector; and determining the first sub-pixel motion vector adjustment value according to a cost value corresponding to the optimal motion vector and cost values corresponding to edge motion vectors corresponding to the optimal motion vector.

9. The method of claim 8, wherein, determining the first sub-pixel motion vector adjustment value according to a cost value corresponding to the optimal motion vector and cost values corresponding to edge motion vectors corresponding to the optimal motion vector comprises:
sequentially determining cost values of 5 integer-pixel motion vectors which take the optimal motion vector as a center; wherein the 5 integer-pixel motion vectors are 5 edge motion vectors obtained by shifting horizontally to the left, horizontally to the right, vertically upward and vertically downward respectively when taking the optimal motion vector as a center.

10. The method of claim 6, wherein, the first target motion vector is equal to a sum of the first original motion vector, the first integer-pixel motion vector adjustment value and the first sub-pixel motion vector adjustment value; the second target motion vector is equal to a sum of the second original motion vector, the second integer-pixel motion vector adjustment value and the second sub-pixel motion vector adjustment value; wherein, the second integer-pixel motion vector adjustment value and the first integer-pixel motion vector adjustment value are opposite numbers to each other; the second sub-pixel motion vector adjustment value and the first sub-pixel motion vector adjustment value are opposite numbers to each other.

11. The method of claim 1, wherein,
the optimal motion vector is a motion vector having a smallest cost value selected from the original motion vector and the candidate motion vectors.

12. The method of claim 4, wherein,
when an absolute value of the first integer-pixel motion vector adjustment value in the vertical and/or horizontal direction is equal to a preset value, adjusting the first original motion vector according to the first integer-pixel motion vector adjustment value to obtain the first target motion vector corresponding to the first original motion vector.

13. The method of claim 7, wherein,
when an absolute value of the first integer-pixel motion vector adjustment value in the vertical and/or horizontal direction is not equal to a preset value, adjusting the first original motion vector according to the first integer-pixel motion vector adjustment value and the first sub-pixel motion vector adjustment value to obtain the first target motion vector corresponding to the first original motion vector.

14. The method of claim 1, wherein,
when the cost value corresponding to the initial motion vector is bigger than or equal to a preset threshold, implementing the step of selecting a motion vector from the initial motion vector and the candidate motion vectors as the optimal motion vector according to the cost value corresponding to the initial motion vector and the cost values corresponding to the candidate motion vectors; otherwise, the step is not implemented, wherein the preset threshold is determined according to a width and height of the sub-block.

15. The method of claim 1, wherein, when the current block comprises one sub-block, the sub-block is the current block itself.

16. An encoding method, comprising:
when a current block enables a motion vector refinement mode, determining prediction values of sub-blocks of the current block, and determining a prediction value of the current block according to the prediction values of sub-blocks of the current block, wherein for each sub-block of the current block, determining a prediction value of a sub-block comprises:
obtaining motion information of the current block comprising a first original motion vector and a first reference frame, a second original motion vector and a second reference frame;
determining a first reference block corresponding to the sub-block according to the first original motion vector of the current block, and determining a second reference block corresponding to the sub-block according to the second original motion vector of the current block;
obtaining an optimal motion vector according to pixel values of the first reference block and pixel values of the second reference block, wherein obtaining optimal motion vector comprises:
taking an initial motion vector as a center, selecting motion vectors from the motion vectors containing the initial motion vector and the motion vectors surrounding the initial motion vector, and determining the selected motion vectors as candidate motion vectors; wherein the initial motion vector is the first original motion vector or the second original motion vector; obtaining a cost value corresponding to the initial motion vector and cost values corresponding to the candidate motion vectors according to the pixel values of the first reference block and the pixel values of the second reference block; selecting a motion vector from the initial motion vector and the candidate motion vectors as the optimal motion vector according to the cost value corresponding to the initial motion vector and the cost values corresponding to the candidate motion vectors;
adjusting the first original motion vector and the second original motion vector according to the optimal motion vector to obtain a first target motion vector corresponding to the first original motion vector and a second target motion vector corresponding to the second original motion vector;
determining the prediction value of the sub-block according to the first target motion vector and the second target motion vector; wherein determining the prediction value of the sub-block according to the first target motion vector and the second target motion vector comprises: determining a third reference block corresponding to the sub-block according to the first target motion vector, and determining a fourth reference block corresponding to the sub-block according to second target motion vector; weighting pixel values of the third reference block and pixel values of the fourth reference block to obtain the prediction value of the sub-block.

17. A decoding apparatus, comprising: a processor and a machine-readable storage medium, wherein the machine-readable storage medium has stored thereon machine-executable instructions executable by the processor; the processor is used to execute machine-executable instructions so as to implement the following steps:
when a current block enables a motion vector refinement mode, determining prediction values of sub-blocks of the current block, and determining a prediction value of the current block according to the prediction values of sub-blocks of the current block, wherein for each sub-block of the current block, determining a prediction value of a sub-block comprises:

obtaining motion information of the current block comprising a first original motion vector and a first reference frame, a second original motion vector and a second reference frame;

determining a first reference block corresponding to the sub-block according to the first original motion vector of the current block, and determining a second reference block corresponding to the sub-block according to the second original motion vector of the current block;

obtaining an optimal motion vector according to pixel values of the first reference block and pixel values of the second reference block, wherein obtaining an optimal motion vector comprises:

taking an initial motion vector as a center, selecting motion vectors from the motion vectors containing the initial motion vector and the motion vectors surrounding the initial motion vector, and determining the selected motion vectors as candidate motion vectors; wherein the initial motion vector is the first original motion vector or the second original motion vector; obtaining a cost value corresponding to the initial motion vector and cost values corresponding to the candidate motion vectors according to the pixel values of the first reference block and the pixel values of the second reference block; selecting a motion vector from the initial motion vector and the candidate motion vectors as the optimal motion vector according to the cost value corresponding to the initial motion vector and the cost values corresponding to the candidate motion vectors;

adjusting the first original motion vector and the second original motion vector according to the optimal motion vector to obtain a first target motion vector corresponding to the first original motion vector and a second target motion vector corresponding to the second original motion vector;

determining the prediction value of the sub-block according to the first target motion vector and the second target motion vector; wherein determining the prediction value of the sub-block according to the first target motion vector and the second target motion vector comprises: determining a third reference block corresponding to the sub-block according to the first target motion vector, and determining a fourth reference block corresponding to the sub-block according to second target motion vector; weighting pixel values of the third reference block and pixel values of the fourth reference block to obtain the prediction value of the sub-block.

18. An encoding apparatus, comprising: a processor and a machine-readable storage medium, wherein the machine-readable storage medium has stored thereon machine-executable instructions executable by the processor; the processor is used to execute machine-executable instructions so as to implement the following steps:

when a current block enables a motion vector refinement mode, determining prediction values of sub-blocks of the current block, and determining a prediction value of the current block according to the prediction values of sub-blocks of the current block, wherein for each sub-block of the current block, determining a prediction value of a sub-block comprises:

obtaining motion information of the current block comprising a first original motion vector and a first reference frame, a second original motion vector and a second reference frame;

determining a first reference block corresponding to the sub-block according to the first original motion vector of the current block, and determining a second reference block corresponding to the sub-block according to the second original motion vector of the current block;

obtaining an optimal motion vector according to pixel values of the first reference block and pixel values of the second reference block, wherein obtaining an optimal motion vector comprises:

taking an initial motion vector as a center, selecting motion vectors from the motion vectors containing the initial motion vector and the motion vectors surrounding the initial motion vector, and determining the selected motion vectors as candidate motion vectors; wherein the initial motion vector is the first original motion vector or the second original motion vector; obtaining a cost value corresponding to the initial motion vector and cost values corresponding to the candidate motion vectors according to the pixel values of the first reference block and the pixel values of the second reference block; selecting a motion vector from the initial motion vector and the candidate motion vectors as the optimal motion vector according to the cost value corresponding to the initial motion vector and the cost values corresponding to the candidate motion vectors;

adjusting the first original motion vector and the second original motion vector according to the optimal motion vector to obtain a first target motion vector corresponding to the first original motion vector and a second target motion vector corresponding to the second original motion vector;

determining the prediction value of the sub-block according to the first target motion vector and the second target motion vector; wherein determining the prediction value of the sub-block according to the first target motion vector and the second target motion vector comprises: determining a third reference block corresponding to the sub-block according to the first target motion vector, and determining a fourth reference block corresponding to the sub-block according to second target motion vector; weighting pixel values of the third reference block and pixel values of the fourth reference block to obtain the prediction value of the sub-block.

19. A decoder, wherein the decoder is configured to implement the following steps:

when a current block enables a motion vector refinement mode, determining prediction values of sub-blocks of the current block, and determining a prediction value of the current block according to the prediction values of sub-blocks of the current block, wherein for each sub-block of the current block, determining a prediction value of a sub-block comprises:

obtaining motion information of the current block comprising a first original motion vector and a first reference frame, a second original motion vector and a second reference frame;

determining a first reference block corresponding to the sub-block according to the first original motion vector of the current block, and determining a second reference block corresponding to the sub-block according to the second original motion vector of the current block;

obtaining an optimal motion vector according to pixel values of the first reference block and pixel values of the second reference block, wherein obtaining an optimal motion vector comprises:

taking an initial motion vector as a center, selecting motion vectors from the motion vectors containing the initial motion vector and the motion vectors surrounding the initial motion vector, and determining the selected motion vectors as candidate motion vectors; wherein the initial motion vector is the first original motion vector or the second original motion vector; obtaining a cost value corresponding to the initial motion vector and cost values corresponding to the candidate motion vectors according to the pixel values of the first reference block and the pixel values of the second reference block; selecting a motion vector from the initial motion vector and the candidate motion vectors as the optimal motion vector according to the cost value corresponding to the initial motion vector and the cost values corresponding to the candidate motion vectors;

adjusting the first original motion vector and the second original motion vector according to the optimal motion vector to obtain a first target motion vector corresponding to the first original motion vector and a second target motion vector corresponding to the second original motion vector;

determining the prediction value of the sub-block according to the first target motion vector and the second target motion vector; wherein determining the prediction value of the sub-block according to the first target motion vector and the second target motion vector comprises: determining a third reference block corresponding to the sub-block according to the first target motion vector, and determining a fourth reference block corresponding to the sub-block according to second target motion vector; weighting pixel values of the third reference block and pixel values of the fourth reference block to obtain the prediction value of the sub-block.

20. A non-transitory machine-readable storage medium, comprising machine-executable instructions executable by a processor stored thereon; the processor is used to execute the machine-executable instructions to implement the method of claim 1.

* * * * *

UNITED STATES PATENT AND TRADEMARK OFFICE
CERTIFICATE OF CORRECTION

| | | |
|---|---|---|
| PATENT NO. | : 11,902,563 B2 | Page 1 of 1 |
| APPLICATION NO. | : 17/433953 | |
| DATED | : February 13, 2024 | |
| INVENTOR(S) | : Fangdong Chen | |

It is certified that error appears in the above-identified patent and that said Letters Patent is hereby corrected as shown below:

In the Specification

In Column 30, Line 53, remove "b1" and replace with --b11--.

Signed and Sealed this
Twenty-third Day of April, 2024

Katherine Kelly Vidal
*Director of the United States Patent and Trademark Office*